United States Patent
Nakajima et al.

(10) Patent No.: US 8,839,242 B2
(45) Date of Patent: Sep. 16, 2014

(54) VIRTUAL COMPUTER MANAGEMENT METHOD AND VIRTUAL COMPUTER MANAGEMENT SYSTEM

(75) Inventors: Noriko Nakajima, Machida (JP); Yasunori Kaneda, Yokohama (JP); Akihisa Nagami, Yokohama (JP); Toru Tanaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 13/062,886

(22) PCT Filed: Feb. 25, 2011

(86) PCT No.: PCT/JP2011/001094
§ 371 (c)(1),
(2), (4) Date: Mar. 8, 2011

(87) PCT Pub. No.: WO2012/114385
PCT Pub. Date: Aug. 30, 2012

(65) Prior Publication Data
US 2012/0222028 A1    Aug. 30, 2012

(51) Int. Cl.
G06F 9/455 (2006.01)
G06F 9/46 (2006.01)
G06F 15/173 (2006.01)
H04L 29/12 (2006.01)

(52) U.S. Cl.
CPC ........ H04L 61/2015 (2013.01); H04L 61/6022 (2013.01); H04L 61/6045 (2013.01); H04L 29/12839 (2013.01); H04L 29/12254 (2013.01); H04L 29/12886 (2013.01); H04L 61/2038 (2013.01)
USPC .............................. 718/1; 718/104; 709/226

(58) Field of Classification Search
None
See application file for complete search history.

(56) References Cited

U.S. PATENT DOCUMENTS

| | | | | |
|---|---|---|---|---|
| 8,458,700 | B1 * | 6/2013 | Arrance et al. | 718/1 |
| 8,601,159 | B2 * | 12/2013 | Brown et al. | 709/245 |
| 2005/0027883 | A1 * | 2/2005 | Carrier | 709/245 |
| 2005/0120160 | A1 * | 6/2005 | Plouffe et al. | 711/1 |
| 2006/0179261 | A1 * | 8/2006 | Rajan | 711/162 |
| 2008/0244579 | A1 * | 10/2008 | Muller | 718/100 |
| 2008/0256314 | A1 * | 10/2008 | Anand et al. | 711/162 |
| 2010/0162241 | A1 * | 6/2010 | Koma | 718/1 |
| 2010/0293269 | A1 * | 11/2010 | Wilson et al. | 709/224 |
| 2012/0185852 | A1 * | 7/2012 | Scales et al. | 718/1 |

FOREIGN PATENT DOCUMENTS

| | | |
|---|---|---|
| JP | 2007-299425 | 11/2007 |
| JP | 2010-147929 | 7/2010 |

OTHER PUBLICATIONS

Vmware Knowledge Base: VirtualCenter (vCenter) Licenses Explained, Nov. 17, 2009, http://kb.vmware.com/kb/1005561.*

* cited by examiner

Primary Examiner — Lewis A Bullock, Jr.
Assistant Examiner — Melissa Alfred
(74) Attorney, Agent, or Firm — Foley & Lardner LLP

(57) ABSTRACT

It is an object of the present invention to provide a technique that can comprehensively manage plural kinds of network addresses allocated to virtual computers. In various embodiments, a MAC address, an IP address, and virtual communication interface identification information are allocated anew to a virtual computer to be created anew and the MAC address, the IP address, and the virtual communication interface identification information are set to be unable to be allocated anew.

12 Claims, 30 Drawing Sheets

Fig. 14

| Virtual Computer identification Information (76011) | Host Name (76012) | MAC Address (76013) | Virtual Communication Interface Identification Information (76014) |
|---|---|---|---|
| VM-01 | host01 | 00:50:56:00:03:1A | 10:00:00:60:69:00:60:01 |
| VM-02 | host02 | 00:50:56:00:03:1B | 10:00:00:60:69:00:60:02 |
| VM-03 | host03 | 00:50:56:00:03:2C | 10:00:00:60:69:00:60:03 |
| ... | ... | ... | ... |

7601

| IP Address (76015) | License Identification Information (76016) |
|---|---|
| 192.168.10.1 | 3142D-3912C-20304-1039F |
| 192.168.10.2 | 3142D-3912C-20304-1039G |
| 192.168.10.5 | 5142D-2412C-20304-1039C |
| ... | ... |

| IP Address (76021) | Allocation Status (76022) | Expiration Date (76023) |
|---|---|---|
| 192.168.10.1 | VM-01 | 2010/12/31 |
| 192.168.10.2 | VM-02 | Null |
| 192.168.10.3 | Null | Null |
| ... | ... | ... |

| MAC Address | Allocation Status | Expiration Date |
|---|---|---|
| 00:50:56:00:03:1A | VM-01 | 2010/12/31 |
| 00:50:56:00:03:1B | VM-01 | 2010/12/31 |
| 00:50:56:00:03:1C | Null | Null |
| ... | ... | ... |

| Virtual Communication Interface Identification Information | Allocation Status | Expiration Date |
|---|---|---|
| 10:00:00:60:69:00:60:01 | VM-01 | 2011/03/30 |
| 10:00:00:60:69:00:60:02 | VM-02 | 2012/03/30 |
| 10:00:00:60:69:00:60:03 | VM-03 | 2012/03/30 |
| ... | | ... |

Table 7605:

| Virtual Computer Identification Information (76051) | User Identification Information (76052) | Domain (76053) |
|---|---|---|
| VM-01 | user01 | vm1.local |
| VM-02 | user01 | vm1.local |
| VM-03 | user02 | vm2ocal |
| ... | ... | ... |

Fig. 19

Table 8261:

| License Identification Information (82611) | Use Permission (82612) | Expiration Date (82613) |
|---|---|---|
| 3142D-3912C-20304-1039C | enable | 2012/03/30 |
| 3142D-3912C-20304-1039F | enable | 2012/03/30 |
| 3142D-3912C-20304-3239A | disable | Null |
| ... | ... | ... |

Fig. 20

(a) Computer Management

| Domain | Computer Identification Information |
|---|---|
| vm.local | host01 |
| vm.local | host02 |
| vm2.local | host03 |
| ... | ... |

(b) User Management

| Domain | User Identification Information |
|---|---|
| vm.local | user01 |
| vm2.local | user02 |
| ... | ... |

Fig. 21

(a) Virtual Computer Creation Screen

790a

Virtual Computer Creation Screen [x]

◆ Please input disk capacity of virtual computer

[_____] GB

◆ Please designate number of virtual computers to be created

[_____]

* Please select from numbers equal to or larger than 1 and smaller than 100

◆ Please designate computer name

[_____]

[Transmit]

(b) Virtual Computer Deletion Screen

790b

Virtual Computer Deletion Screen [x]

◆ Please select VM to be deleted

- ☑ VM1
- ☐ VM2
- ☑ VM3
- ☐ VM4
- ☐ VM5
- ☐ VM6
- ☐ VM7
- ☐ VM8

[Transmit]

VIRTUAL COMPUTER MANAGEMENT METHOD AND VIRTUAL COMPUTER MANAGEMENT SYSTEM

TECHNICAL FIELD

The present invention relates to a method and a system for managing a virtual computer.

BACKGROUND ART

There is a server virtualization technique as a technique for efficiently operating storage resources and facilitating management. As the server virtualization technique, for example, there is a so-called software-based server virtualization technique. In the technique, a special virtualization program is run on an actual host computer. The virtualization program constructs, on the actual host computer, a virtual computer having components, the number of components, and a processing ability different from those of the actual host computer. With the technique, an IT administrator can perform management using a necessary calculation processing ability by only a necessary amount without being aware of the components, the number of components, the processing ability, and the like of the actual host computer.

On the other hand, according to the development of outsourcing in these years, company systems are aggregated in a data center. As a result, it is necessary to set a large number of virtual computers in a state in which the virtual computers can be instantly used. As a technique for realizing this, there is a technique for pooling IP (Internet Protocol) addresses and MAC (Media Access Control) addresses and allocating the addresses when a virtual computer is created anew. It is possible to prevent the addresses from being redundantly allocated by managing a status in which the addresses are allocated to the virtual computers.

Patent Literature 1 describes, as an example of a technique for managing a virtual computer, a method of checking in advance a storage extent necessary in creating a virtual computer.

Patent Literature 2 describes a method of sharing information concerning addresses secured by physical machines to prevent addresses from being redundantly allocated.

CITATION LIST

Patent Literature

PTL 1: JP Patent Publication (Kokai) No. 2007-299425 A
PTL 2: JP Patent Publication (Kokai) No. 2010-147929 A

SUMMARY OF INVENTION

Technical Problem

In the technique described in Patent Literature 1, since an administrator needs to manually manage an allocation status of network addresses, a management load is large.

In the technique described in Patent Literature 2, although an allocation status of MAC addresses is managed, for preventing redundancy of network addresses, it is insufficient to only manage the allocation status of the MAC addresses.

The present invention has been devised to solve the problems explained above and it is an object of the present invention to provide a technique that can comprehensively manage plural kinds of network addresses allocated to virtual computers.

Solution to Problem

In a virtual computer management method according to the present invention, a MAC address, an IP address, and virtual communication interface identification information are allocated anew to a virtual computer created anew and the MAC address, the IP address, and the virtual communication interface identification information are set to be unable to be allocated anew.

Advantageous Effects of Invention

With the virtual computer management method according to the present invention, it is possible to comprehensively manage, besides a network address allocated to a host computer, identification information allocated to virtual communication interfaces of virtual computers and prevent the identification information from being redundantly allocated.

BRIEF DESCRIPTION OF DRAWINGS

FIG. 14 is a diagram showing the configuration and a data example of a virtual computer management information 7601 stored by the virtual environment management computer 700.

FIG. 15 is a diagram showing the configuration and a data example of IP address management information 7602 stored by the virtual environment management computer 700.

FIG. 16 is a diagram showing the configuration and a data example of MAC address management information 7603 stored by the virtual environment management computer 700.

FIG. 17 is a diagram showing the configuration and a data example of virtual communication interface management information 7604 stored by the virtual environment management computer 700.

FIG. 18 is a diagram showing the configuration and a data example of user management information 7605 stored by the virtual environment management computer 700.

FIG. 19 is a diagram showing the configuration and a data example of license management information 8261 stored by the license management computer 820.

FIG. 20 is a diagram showing the configuration and a data example of domain management information 8361 stored by the domain management computer 830.

FIG. 21 is a screen image diagram of an operation screen 790 provided by the virtual environment management computer 700.

DESCRIPTION OF EMBODIMENTS

Embodiments of the present invention are explained below with reference to the drawings. The present invention is not limited by the explanation.

First Embodiment

Figure 1:
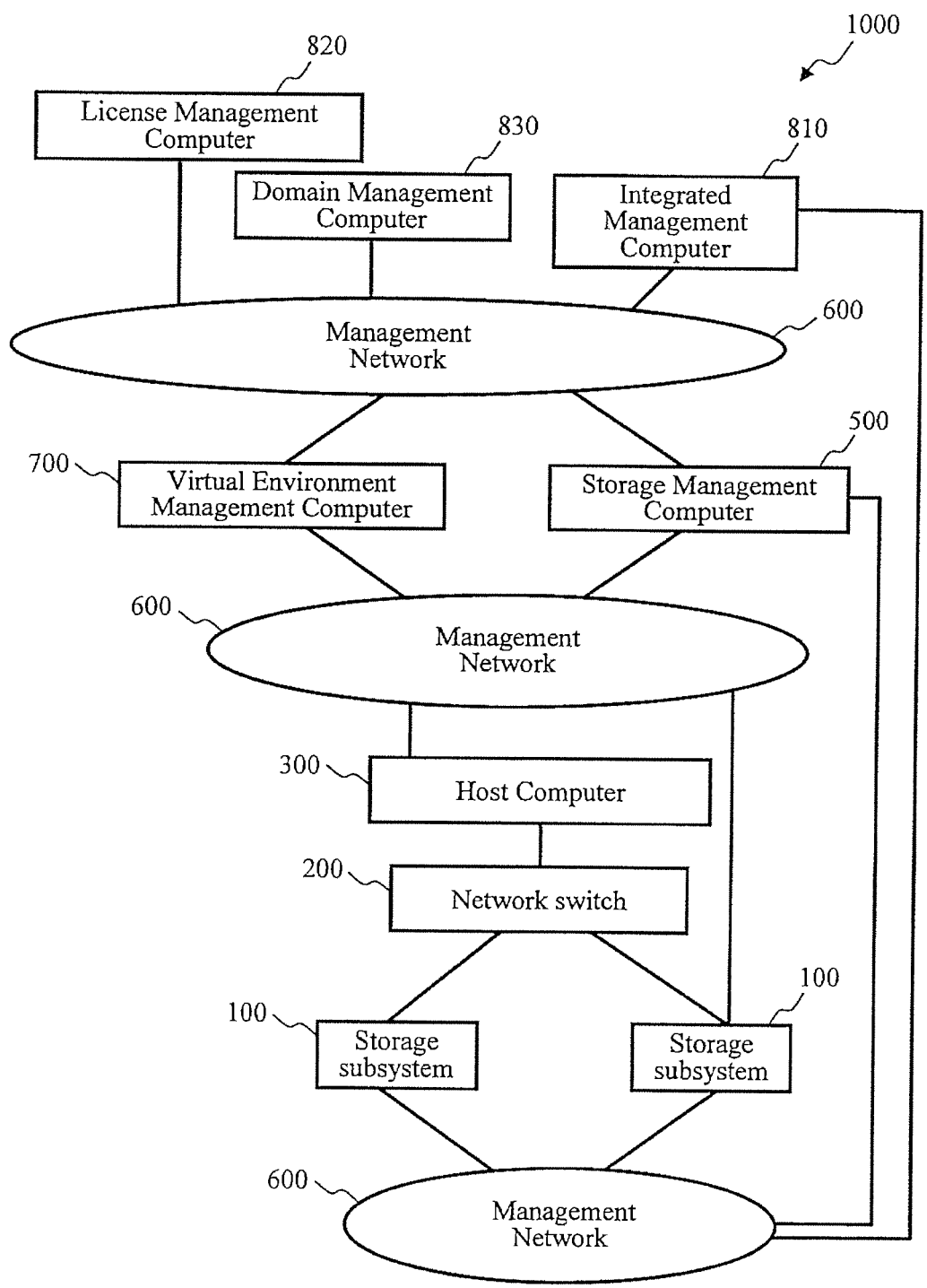
FIG. 1 is a diagram showing a network configuration of a virtual computer management system 1000.

FIG. 1 is a diagram showing a network configuration of a virtual computer management system 1000. The virtual computer management system 1000 is a system that manages generation, deletion, migration, and the like of a virtual computer and includes a storage subsystem 100, a host computer 300, a storage management computer 500, a virtual environment management computer 700, an integrated management computer 810, a license management computer 820, and a domain management computer 830.

The host computer 300, the storage management computer 500, the virtual environment management computer 700, the integrated management computer 810, the license management computer 820, and the domain management computer 830 can be configured using general computers. Details of these computers are explained later.

The storage subsystem 100 is mounted with storage media such as hard disks and provides storage extents serving as a unit of an area in which data is stored. The host computer 300 executes a virtual computer 400 explained later and runs applications such as a database and a file server on the virtual computer 400. The host computer 300 inputs and outputs data to and from the storage extents provided by the storage subsystem 100. The storage subsystem 100 and the host computer 300 are connected via a network switch 200 and configured to be capable of inputting and outputting to and from each other.

The storage management computer 500 is a computer that manages the configuration of the storage extents provided by the storage subsystem 100 and is connected to the storage subsystem 100 and the virtual environment management computer 700 via a management network 600.

The virtual environment management computer 700 is a computer that manages generation, deletion, migration, and the like of a virtual computer executed by the host computer 300 and is connected to the host computer 300 and the storage management computer 500 via the management network 600.

The integrated management computer 810 is a computer that acquires configuration information stored by the storage management computer 500 and the virtual environment management computer 700 and comprehensively manages the storage subsystem 100 and the host computer 300. Processing for the management may be directly carried out by the integrated management computer 810 or may be carried out via the storage management computer 500 and the virtual environment management computer 700. The integrated management computer 810 is connected to the storage management computer 500, the virtual environment management computer 700, the license management computer 820, and the domain management computer 830 via the management network 600.

The license management computer 820 is a computer that manages a license of an operating system (OS) of a virtual computer executed by the host computer 300. The domain management computer 830 is a domain controller that manages a network domain in which the virtual computer 400 executed by the host computer 300 participates. The network domain is a management unit for comprehensively managing a computer and a user on an OS of the computer. For example, a domain in a Windows (registered trademark) network corresponds to the network domain. The license management computer 820 and the domain management computer 830 are connected to the virtual management computer 700 via the management network 600.

In the network configuration shown in FIG. 1, the management network 600 and a data I/O network configured by the network switch 200 are configured separately from each other. However, a single network may be configured to serve as both the purposes.

Figure 2:
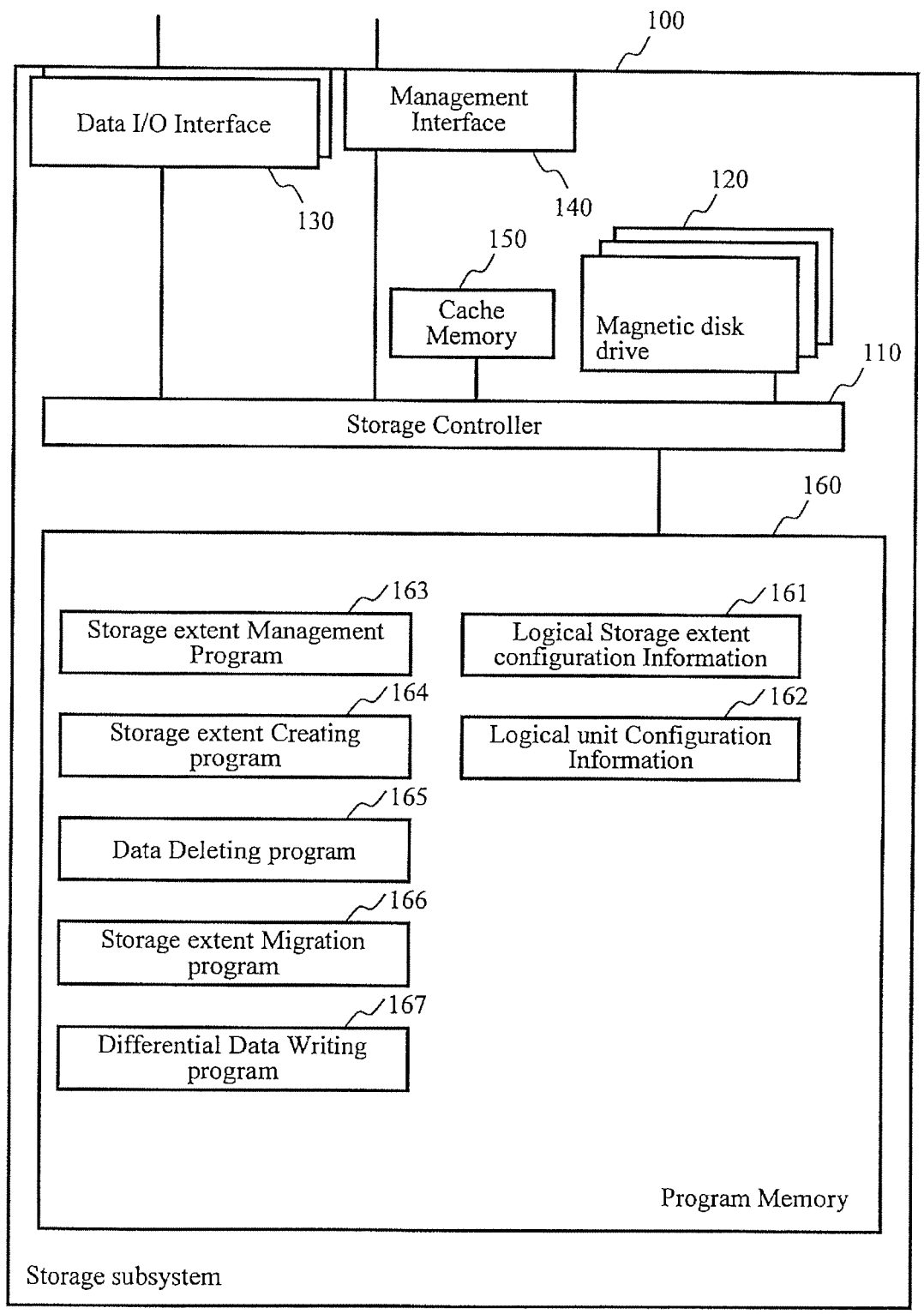
FIG. 2 is a functional block diagram of a storage subsystem 100.

FIG. 2 is a functional block diagram of the storage subsystem 100. The storage subsystem 100 includes a storage controller 110, magnetic disk drives 120, a data I/O interface 130, a management interface 140, a cache memory 150, a program memory 160.

The storage controller 110 is mounted with a processor that controls the operation of the storage subsystem 100. The storage controller 110 executes programs stored by the program memory 160. In the following explanation, for convenience of description, in some case, the programs are explained as operation entities. However, it should be noted that a device that actually executes the programs is a processor such as the storage controller 110.

The magnetic disk drives 120 are storage media that provide storage extents used by the host computer 300. Storage media other than the magnetic disk drives can also be used. The data I/O interface 130 is a communication interface connected to the network switch 200 to input and output data. The management interface 140 is a communication interface connected to the management network 600 to input and output management information.

The cache memory 150 is a temporary storage device for increasing speed of data input and output between the host computer 300 and the storage extents. As the cache memory 150, implementation by a volatile memory is generally used. However, a non-volatile memory or the magnetic disk drive 120 may be used instead of the cache memory 150. In the present invention, no limitation is set for the number of cache memories 150 and the capacity of the cache memory 150.

The program memory 160 is a memory space implemented by the magnetic disk drives 120, a volatile semiconductor memory, or the like. The program memory 160 has stored therein programs and management information necessary for the operation of the storage subsystem 100. The program memory 160 stores logical storage extent configuration information 161, logical unit configuration information 162, a storage extent management program 163, a storage extent creating program 164, a data deleting program 165, a storage extent migration program 166, and a differential data writing program 167. Details of the information and the programs are explained later.

The storage extent management program 163 manages attributes of a logical unit 10 and a logical storage extent 11 explained later. The storage extent management program 163 defines an LU (Logical Unit) path according to an instruction from the host computer 300 and associates the logical storage extent 11 and the logical unit 10. The storage extent creating program 164 creates the logical storage extent 11 according to an instruction from the storage management computer 500. The data deleting program 165 deletes data stored in the designated logical storage extent 11 (or the logical storage extent 11 itself). The storage extent migration program 166 is a program for migrating the logical storage extent 11 to another storage subsystem 100. The differential data writing program 167 copies differential data. The differential data writing program 167 has a writable differential copy (writable snapshot) function and copies the logical storage extent 11 using the function to enable a virtual computer to use the logical storage extent 11.

The data I/O interface 130 and the management interface 140 can be implemented using a network I/O device by a fibre channel, an Ethernet, or the like. In the present invention, no limitation is set for the number of data I/O interfaces 130 and the number of management interfaces 140. The data I/O interface 130 and the management interface 140 may be integrated and serve as both the roles.

Figure 3:
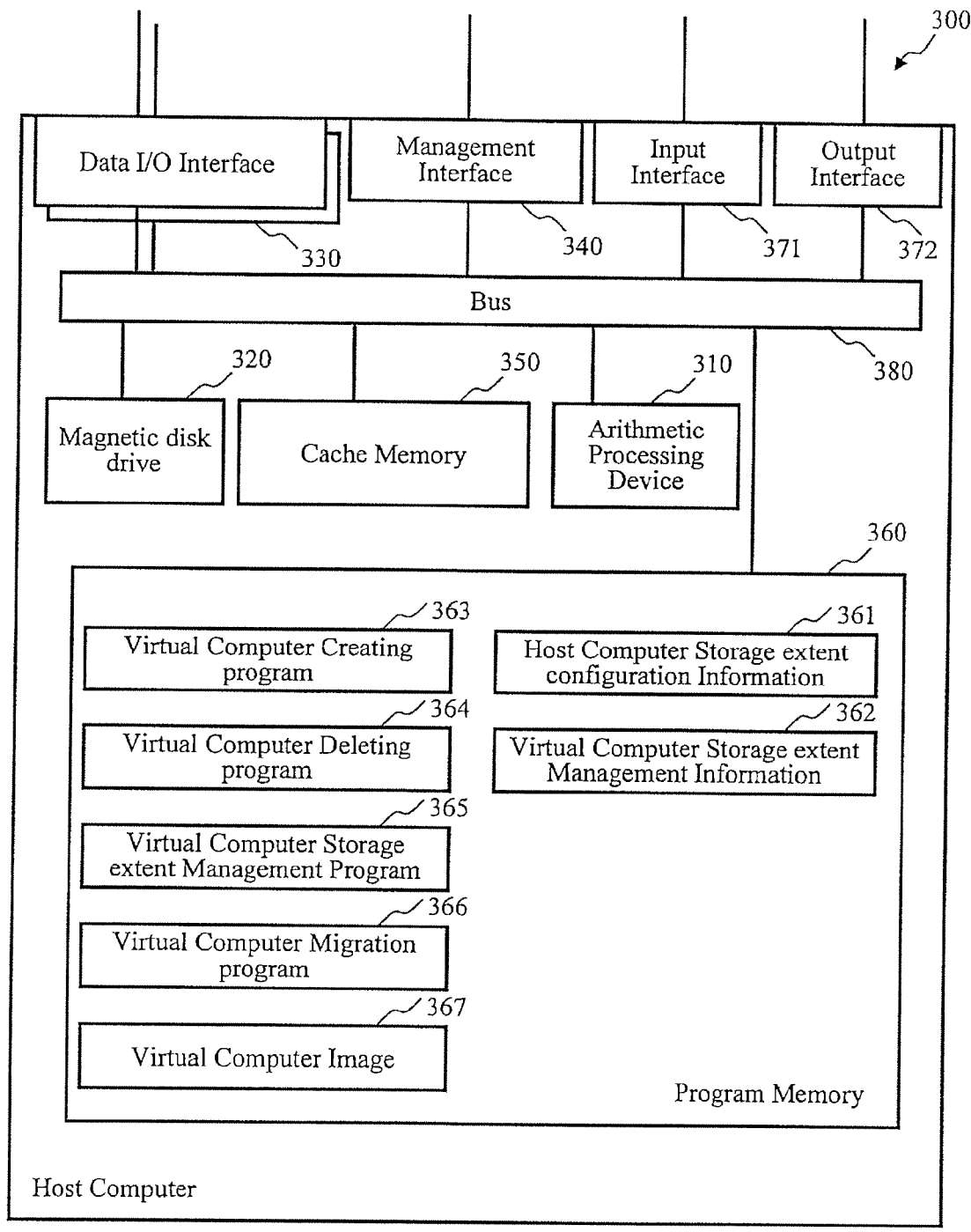
FIG. 3 is a functional block diagram of a host computer 300.

FIG. 3 is a functional block diagram of the host computer 300. The host computer 300 includes an arithmetic processing device 310, a magnetic disk drive 320, data I/O interfaces 330, a management interface 340, a cache memory 350, a program memory 360, an input interface 371, an output interface 372, and a bus 380.

The arithmetic processing device 310 executes programs stored by the program memory 360. The magnetic disk drive 320 is a storage device included in the host computer 300 itself and has stored therein software such as an OS and applications. The data I/O interfaces 330 are communication interfaces connected to the network switch 200 to input and output data. The management interface 340 is a communication interface connected to the management network 600 to input and output management information. The input interface 371 is an input device such as a keyboard or a mouse for an operator to input information. The output interface 372 is an output device such as a general-purpose display for outputting information to the operator. The bus 380 connects the components.

The cache memory 350 is a temporary storage device for increasing speed of data input and output. As the cache memory 350, implementation by a volatile memory is generally used. However, a nonvolatile memory or the magnetic disk drive 320 may be used instead of the cache memory 350. In the present invention, no limitation is set for the number of cache memories 350 and the capacity of the cache memory 350.

The program memory 360 is a memory space implemented by the magnetic disk drive 320, a volatile semiconductor memory, or the like and has stored therein programs and management information necessary for the operation of the host computer 300. The program memory 360 has stored therein host computer storage extent configuration information 361, virtual computer storage extent management information 362, a virtual computer creating program 363, a virtual computer deleting program 364, a virtual computer storage extent management program 365, a virtual computer migration program 366, and a virtual computer image 367. Details of the information and the programs are explained later.

The virtual computer image 367 is image data for storing an execution image of the virtual computer 400 explained later. The host computer 300 expands the virtual computer image 367 on a storage extent and creates the virtual computer 400. The configuration of the virtual computer 400 is explained later.

When the virtual computer creating program 363 receives a request from the virtual environment management computer 700 to create the virtual computer 400, the virtual computer creating program 363 virtualizes the cache memory 350 and the arithmetic processing device 310 and allocates the virtualized cache memory 350 and the virtualized arithmetic processing device 310 to the virtual computer 400. Further, the virtual computer creating program 363 creates the virtual computer 400 on the logical unit 10 of the magnetic disk drive 320 or the storage subsystem 100.

When the virtual computer deleting program 364 receives a request from the virtual environment management computer 700 to delete the virtual computer 400, the virtual computer deleting program 364 releases the cache memory 350 and the arithmetic processing device 310 allocated to the virtual computer 400 and deletes the virtual computer 400 from the storage extent.

The virtual computer storage extent management program 365 manages configuration information of the virtual computer 400 and the host computer 300. For example, the virtual computer storage extent management program 365 executes processing for transmitting management information to the virtual environment management computer 700 and updating the host computer storage extent configuration information 361 and the virtual computer storage extent management information 362 when a virtual computer is created or deleted.

The virtual computer migration program 366 migrates the virtual computer image 367 to another host computer 300 to thereby migrate the virtual computer 400 corresponding to the virtual computer image 367. For example, the virtual computer migration program 366 monitors a use ratio of the arithmetic processing device 310 and migrates the virtual computer image 400 such that loads can be distributed among host computers 300. The virtual computer image 367 is explained later.

The data I/O interfaces 330 and the management interface 340 can be implemented using a network I/O device by a fibre channel, an Ethernet, or the like. In the present invention, no limitation is set for the number of data I/O interfaces 330 and the number of management interfaces 340. The data I/O interfaces 330 and the management interface 330 may be integrally configured and serve as both the roles.

Figure 4:
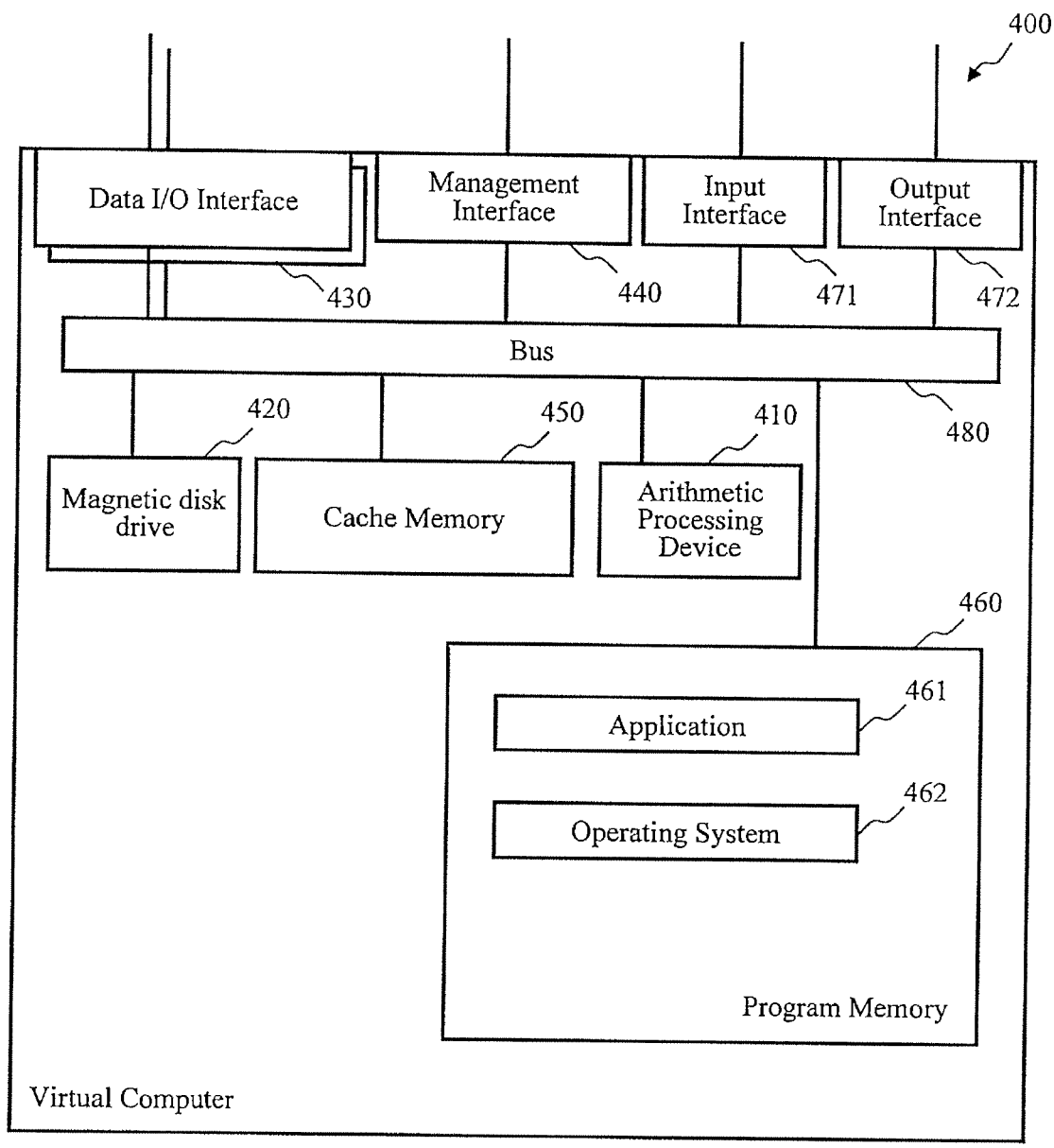
FIG. 4 is a functional block diagram of a virtual computer 400.

FIG. 4 is a functional block diagram of the virtual computer 400. The virtual computer 400 is a virtual computer generated by virtualizing and allocating resources such as the cache memory 350 and the arithmetic processing device 310 included in the host computer 300. The virtual computer 400 includes virtualized components same as those of the host computer 300.

The virtual computer 400 includes an arithmetic processing device 410, a magnetic disk drive 420, data I/O interfaces 430, a management interface 440, a cache memory 450, a program memory 460, an input interface 471, an output interface 472, and a bus 480. Since these components are obtained by virtualizing and allocating the components of the host computer 300, the virtual computer 400 is the same as the host computer 300 except the program memory 460.

The program memory 460 is a memory space implemented by the magnetic disk drive 420, a volatile semiconductor memory, or the like. The program memory 460 has stored therein an application 461 and an operation system 462. The application 461 is an application program executed by the virtual computer 400. The operating system 462 is an OS of the virtual computer 400. The operating system 462 needs to acquire a license anew every time the virtual computer 400 is created.

Figure 5:
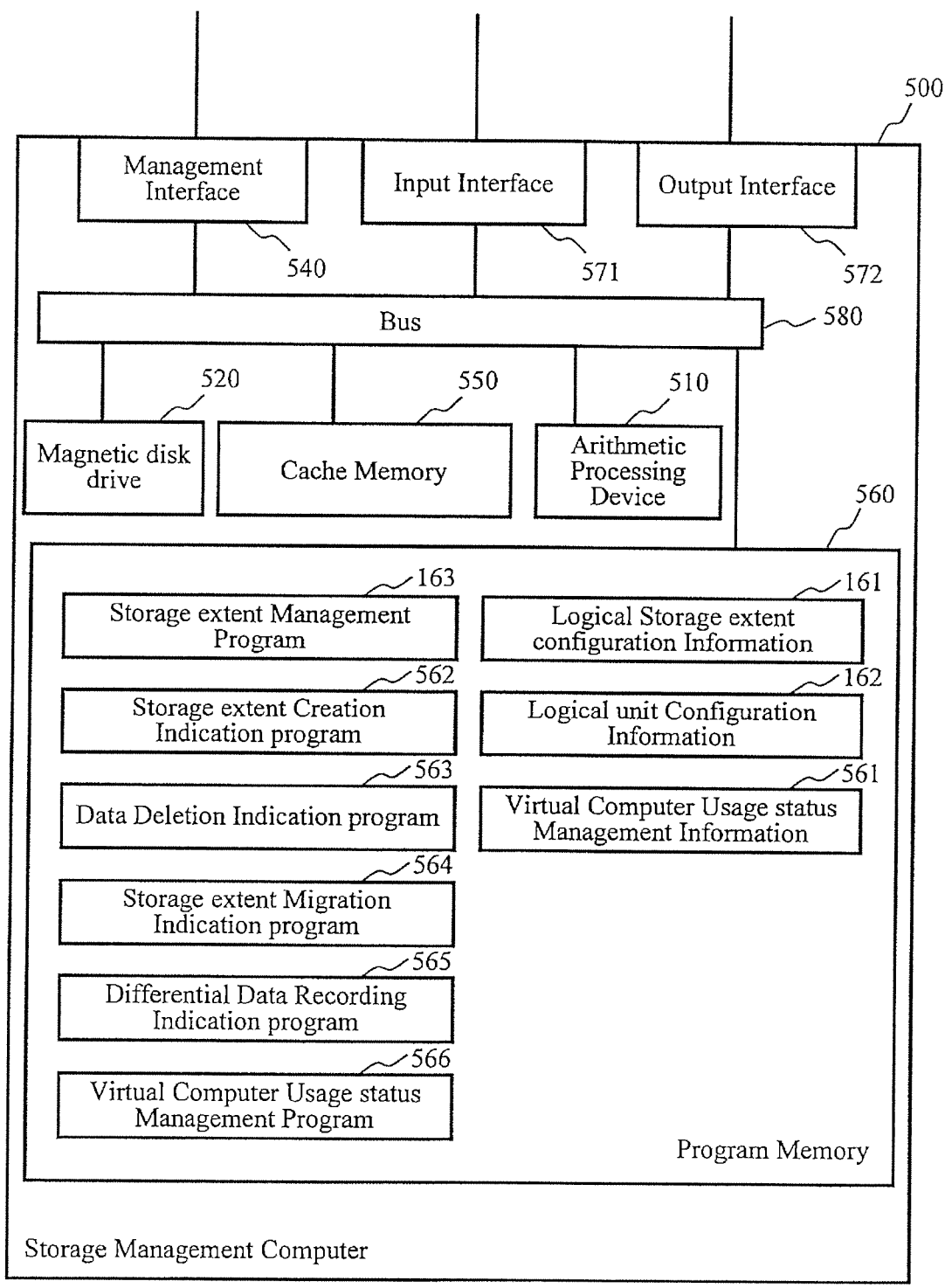
FIG. 5 is a functional block diagram of a storage management computer 500.

FIG. 5 is a functional block diagram of the storage management computer 500. The storage management computer 500 is a computer that mainly stores configuration information concerning the storage subsystem 100 and instructs the storage subsystem 100 to perform processing.

The storage management computer 500 includes an arithmetic processing device 510, a magnetic disk drive 520, a management interface 540, a cache memory 550, a program memory 560, an input interface 571, an output interface 572, and a bus 580. These components are the same as those of the host computer 300 except that the storage management computer 500 does not include the data I/O interfaces 330 and except content of the program memory 560.

The program memory 560 is a memory space implemented by the magnetic disk drive 520 or a volatile semiconductor memory. The program memory 560 has stored therein programs and management information necessary for the operation of the storage management computer 500. The program memory 560 has stored therein logical storage extent configuration information 161, logical unit configuration information 162, virtual computer usage status management information 561, a storage extent management program 163, a storage extent creation indication program 562, a data deletion indication program 563, a storage extent migration indication program 564, a differential data recording indication program 565, and a virtual computer usage status management program 566. Details of the information and the programs are explained later.

The logical storage extent configuration information 161, the logical unit configuration information 162, and the storage extent management program 163 are the same as those of the storage subsystem 100. The storage extent creation indication program 562, the data deletion indication program 563, the storage extent migration indication program 564, and the differential data recording indication program 565 respectively instruct the storage extent creating program 164, the data deleting program 165, the storage extent migration program 166, and the differential data writing program 167 of the storage subsystem 100 to carry out the functions of the programs.

The virtual computer usage status management program 566 is a program for requesting the virtual environment management computer 700 to notify the logical unit 10 used by the virtual computer 400 and requesting, when the logical storage extent 11 is set as a deletion target on the storage management computer 500, the virtual environment management computer 700 to delete the virtual computer 400 stored in the logical storage extent 11.

Figure 6:
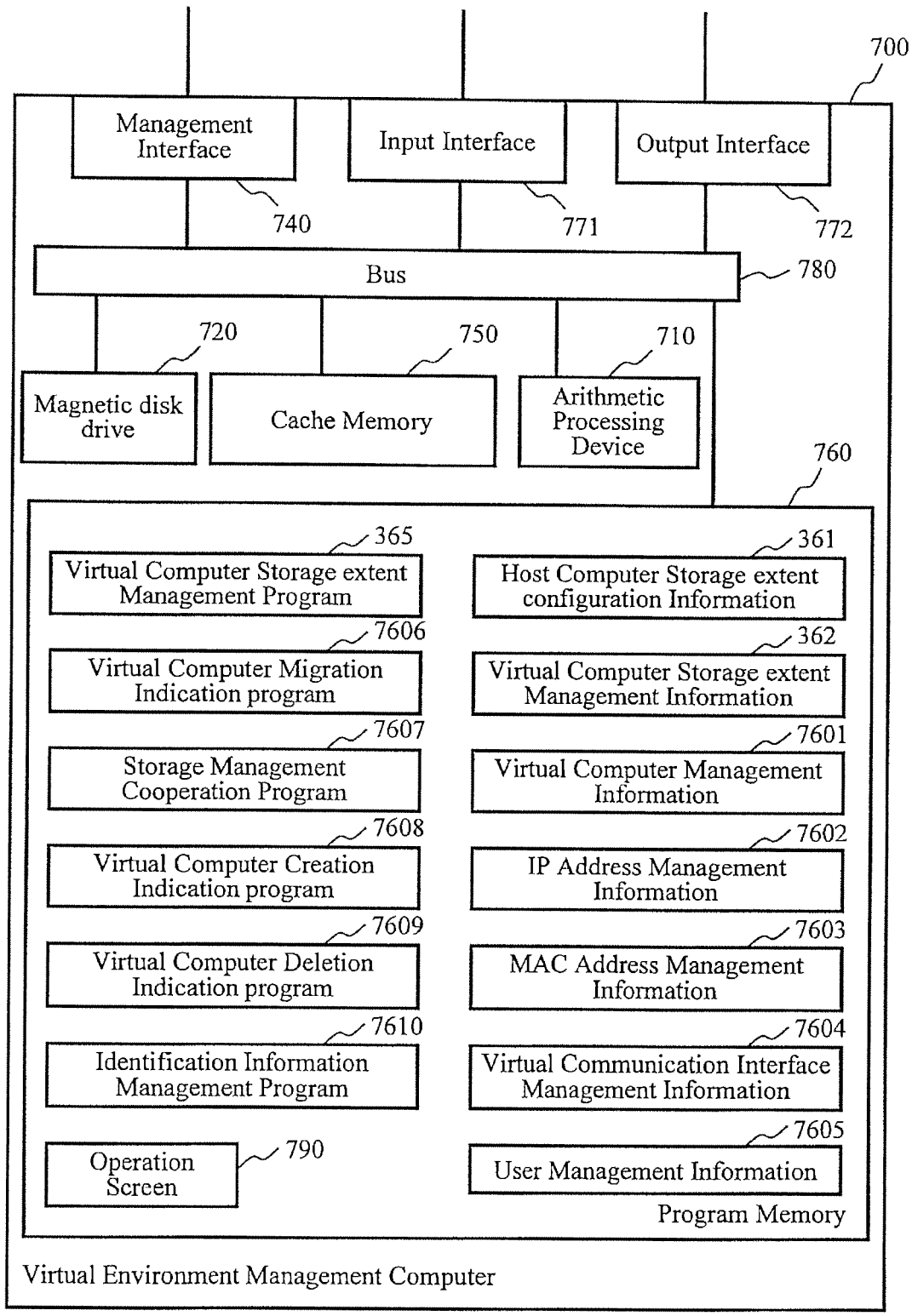
FIG. 6 is a functional block diagram of a virtual environment management computer 700.

FIG. 6 is a functional block diagram of the virtual environment management computer 700. The virtual environment management computer 700 includes an arithmetic processing device 710, a magnetic disk drive 720, a management interface 740, a cache memory 750, a program memory 760, an input interface 771, an output interface 772, and a bus 780. These components are the same as those of the host computer 300 except that the virtual environment management computer 700 does not include the data I/O interface 330 and except content of the program memory 760. The virtual environment management computer 700 further includes an operation screen 790 explained later.

The program memory 760 is a memory space implemented by the magnetic disk drive 720 or a volatile semiconductor memory and has stored therein programs and management information necessary for the operation of the virtual environment management computer 700. The program memory 760 has stored therein host computer storage extent configuration information 361, virtual computer storage extent management information 362, virtual computer management information 7601, IP address management information 7602, MAC address management information 7603, virtual communication interface management information 7604, user management information 7605, a virtual computer storage extent management program 365, a virtual computer migration indication program 7606, a storage management cooperation program 7607, a virtual computer creation indication program 7608, a virtual computer deletion indication program 7609, and an identification information management program 7610. The program memory 760 stores a screen image of the operation screen 790 according to necessity. Details of the information and the programs are explained later.

The host computer storage extent configuration information 361, the virtual computer storage extent management information 362, and the virtual computer storage extent management program 365 are the same as those of the host computer 300. The virtual computer migration indication program 7606, the virtual computer creation indication program 7608, and the virtual computer deletion indication program 7609 respectively instruct the virtual computer migration program 366, the virtual computer creating program 363, and the virtual computer deleting program 364 to carry out the functions of these programs.

When the virtual computer migration indication program 7606 receives a request from the operation screen 790 to migrate the virtual computer 400 to another host computer 300, the virtual computer migration indication program 7606 requests the host computer 300 to migrate the virtual computer 400.

The storage management cooperation program 7607 is a program for requesting the storage management computer 500 to create the logical unit 10 and transmitting the management information when an information acquisition request is received from the storage management computer 500.

The virtual computer creation indication program 7608 request the host computer 300 to create the virtual computer 400 when the virtual computer creation indication program 7608 receives a request from the operation screen 790 to create the virtual computer 400 anew or at schedule time set in advance. When the number of virtual computers to be created and a storage extent capacity are instructed from the operation screen 790, the virtual computer creation indication program 7608 instructs the host computer 300 to create the virtual computer 400 that satisfies the request.

When the virtual computer deletion indication program 7609 receives a request from the operation screen 790 to delete the virtual computer 400, the virtual computer deletion indication program 7609 requests the host computer 300 to delete the virtual computer 400.

When the identification information management program 7610 requests the host computer 300 to create the virtual computer 400, the identification information management program 7610 allocates an IP address, a MAC address, and virtual communication interface identification information in association with the virtual computer 400. The identification information management program 7610 acquires license information and domain information from the license management computer 820 and the domain management computer 830 explained later and allocates the license information and the domain information to the virtual computer 400. When the identification information management program 7610 requests the host computer 300 to delete the virtual computer 400, the identification information management program 7610 releases identification information such as the IP address allocated to the virtual computer 400. Consequently, exhaustion of the identification information is prevented.

Figure 7:
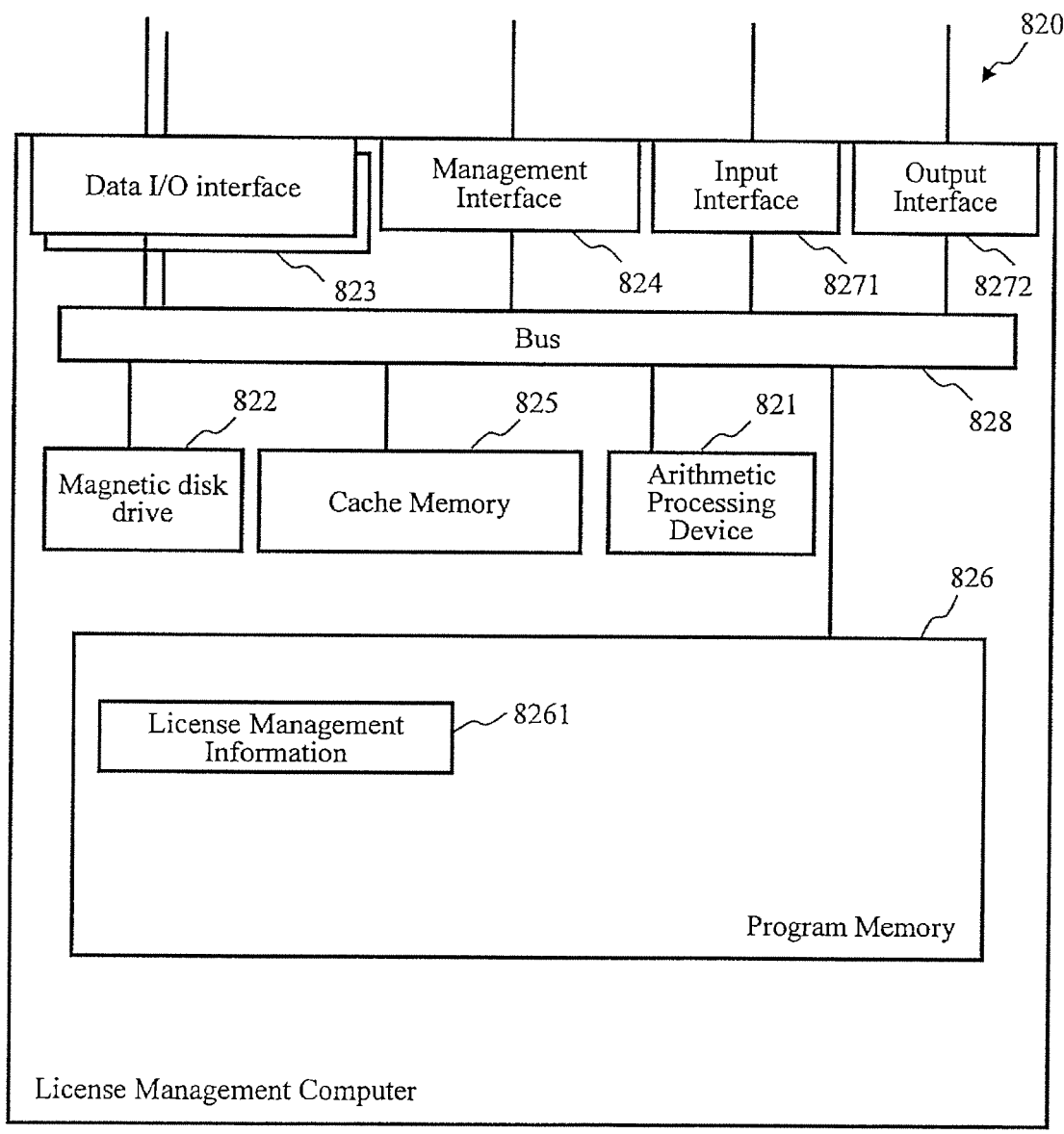
FIG. 7 is a functional block diagram of a license management computer 820.

FIG. 7 is a functional block diagram of the license management computer 820. The license management computer 820 includes an arithmetic processing device 821, a magnetic disk drive 822, data I/O interfaces 823, a management interface 824, a cache memory 825, a program memory 826, an input interface 8271, an output interface 8272, and a bus 828. These components are the same as those of the host computer 300 except content of the program memory 826.

The program memory 826 is a memory space implemented by the magnetic disk drive 822 or a volatile semiconductor memory and has stored therein license information 8261. Details of the license information 8261 are explained later.

Figure 8:
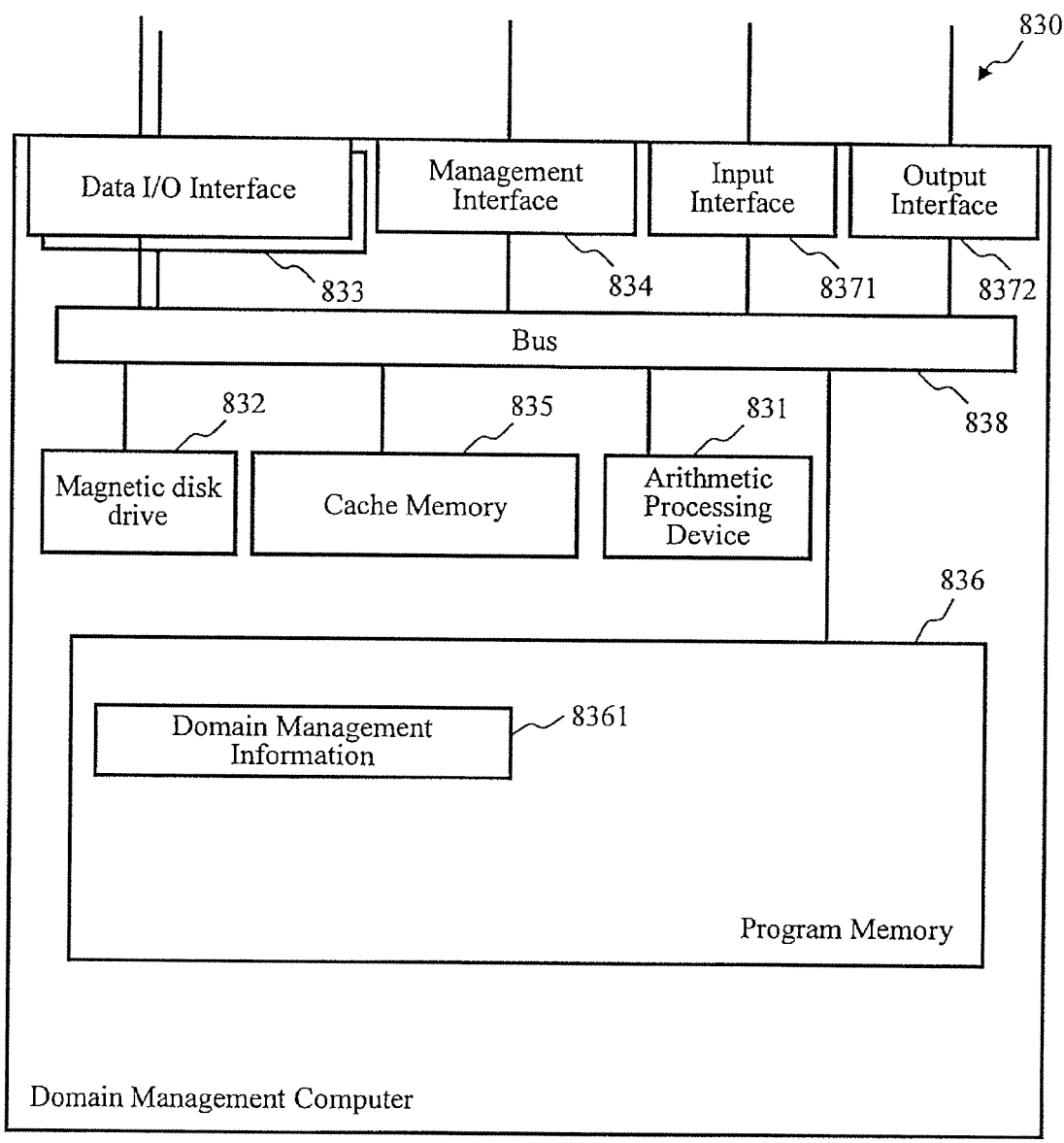
FIG. 8 is a functional block diagram of a domain management computer 830.

FIG. 8 is a functional block diagram of the domain management computer 830. The domain management computer 820 includes an arithmetic processing device 831, a magnetic disk drive 832, a data I/O interface 833, a management interface 834, a cache memory 835, a program memory 836, an input interface 8371, an output interface 8372, and a bus 838. These components are the same as those of the host computer 300 except content of the program memory 836.

The program memory 836 is a memory space implemented by the magnetic disk drive 832 or a volatile semiconductor memory and has stored therein domain management information 8361. Details of the domain management information 8361 are explained later.

Figure 9:
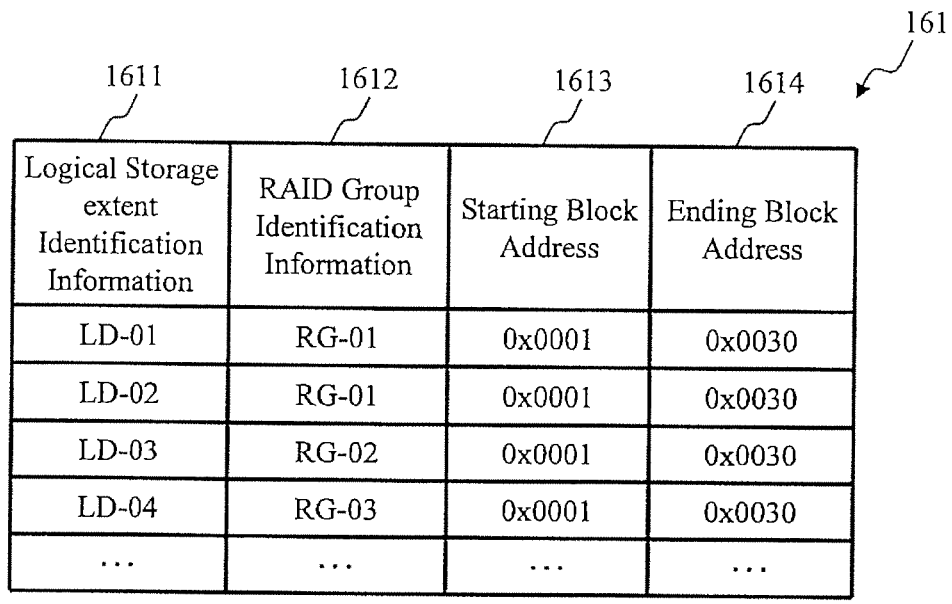
FIG. 9 is a diagram showing the configuration and a data example of logical storage extent configuration information 161 stored by the storage subsystem 100.

FIG. 9 is a diagram showing the configuration and a data example of the logical storage extent configuration information 161 stored by the storage subsystem 100. The logical storage extent configuration information 161 is information for managing a physical configuration of the logical storage extent 11 provided by the storage subsystem 100 and includes a logical storage extent identification information field 1611, a RAID group identification information field 1612, a starting block address field 1613, and an ending block address field 1614.

The logical storage extent identification information field 1611 stores an identifier of the logical storage extent 11. The RAID group identification information field 1612 stores an identifier of a RAID group formed using one or more logical storage extents 11 identified by a value of the logical storage extent identification information field 1611. The starting block address field 1613 and the ending block address field 1614 store a start address and an end address of the logical storage extent 11 identified by a value of the logical storage extent identification information field 1611.

Figure 10:
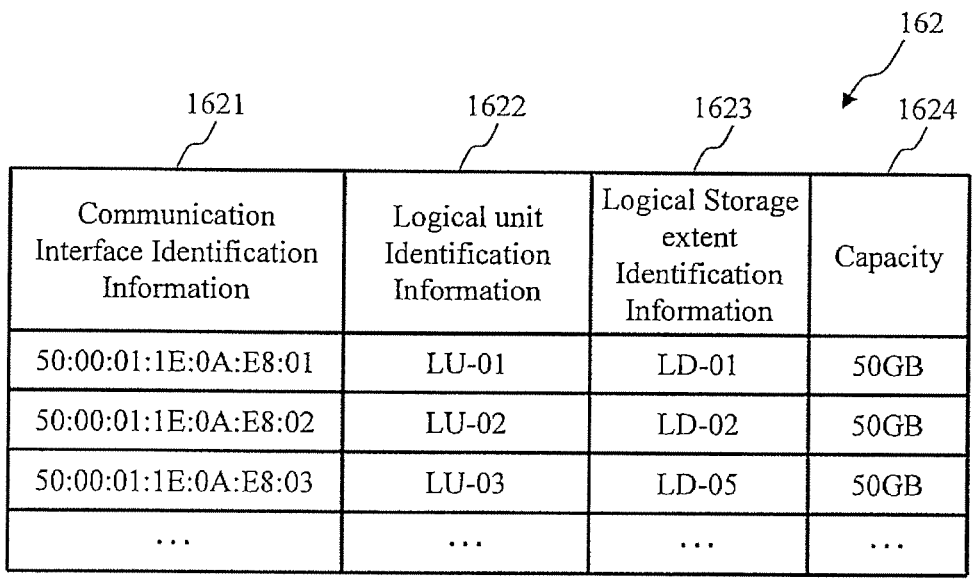
FIG. 10 is a diagram showing the configuration and a data example of a logical unit configuration information 162 stored by the storage subsystem 100.

FIG. 10 is a diagram showing the configuration and a data example of the logical unit configuration information 162 stored by the storage subsystem 100. The logical unit configuration information 162 is information for managing a correspondence relation between the logical unit 10 and the logical storage extent 11 provided by the storage subsystem 100. The logical unit 10 is a unit of a storage resource that can be accessed from the host computer 300 connected to the storage subsystem 100 and is equivalent to a volume mounted on a file system of the host computer 300.

The logical unit configuration information 162 includes a communication interface identification information field 1621, a logical unit identification information field 1622, a logical storage extent identification information field 1623, and a capacity field 1624.

The communication interface identification information field 1621 stores identification information for uniquely identifying a communication interface included in the storage subsystem 100. The identification information is an identifier in a network between the storage subsystem 100 and the host computer 300. For example, when it is necessary to uniquely manage a communication path for accessing the logical unit 10 or when access frequency statistics for each communication interface are acquired, this field can be used.

The logical unit identification information field 1622 stores an identifier of the logical unit 10 associated with a communication interface identified by a value of the communication interface identification information field 1621. Plural logical units 10 can also be associated with one communication interface.

The logical storage extent identification information field 1623 stores an identifier of the logical storage extent 11 that provides the logical unit 10 identified by a value of the logical unit identification information field 1622. This field corresponds to the logical storage extent identification information field 1611 of the logical storage extent configuration information 161.

The capacity field 1624 stores a value indicating a storage capacity of the logical unit 10 identified by a value of the logical unit identification information field 1622.

Figure 11:
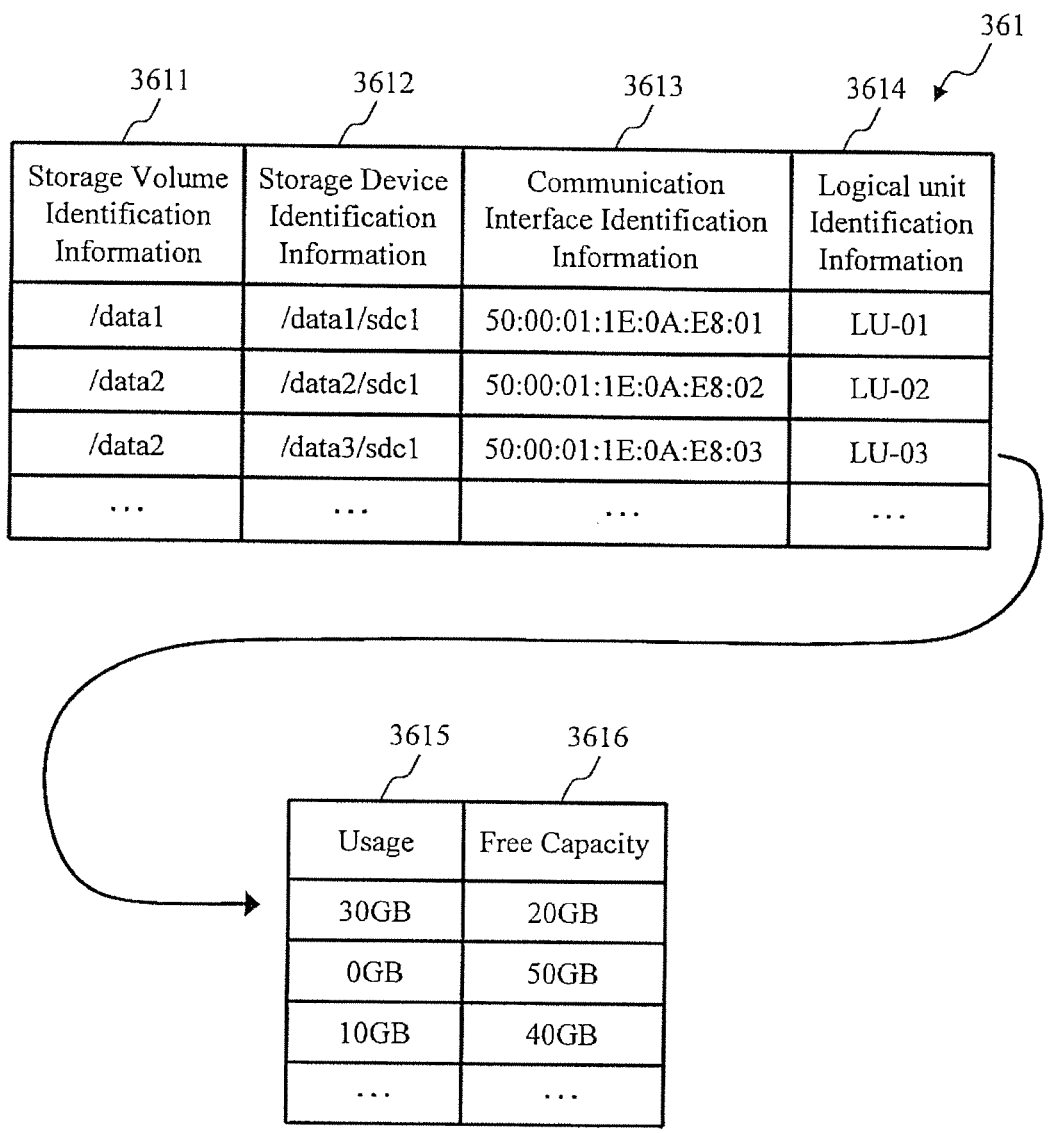
FIG. 11 is a diagram showing the configuration and a data example of a host computer storage extent configuration information 361 stored by the host computer 300.

FIG. 11 is a diagram showing the configuration and a data example of the host computer storage extent configuration information 361 stored by the host computer 300. The host computer storage extent configuration information 361 is information for managing how the host computer 300 is using the logical unit 10 provided by the storage subsystem 100. The host computer storage extent configuration information 361 includes a storage volume identification information field 3611, a storage device identification information field 3612, a communication interface identification information field 3613, a logical unit identification information field 3614, a usage field 3615, and a free capacity field 3616.

The host computer 300 mounts, as a storage volume identified by a value of the storage volume identification information field 3611, a storage device identified by a value of the storage device identification information field 3612.

The logical unit identification information field 3614 stores an identifier of the logical unit 10 that provides the host computer 300 with a storage device identified by a value of the storage device identification information field 3612. The communication interface identification information field 3613 stores an identifier of a communication interface of the storage subsystem 100 associated with the logical unit 10. The communication interface identification information field 3613 corresponds to the communication interface identification information field 1621 of the logical unit configuration information 162.

When the host computer 300 accesses a storage volume identified by a value of the storage volume identification information field 3611, the host computer 300 accesses the logical unit 10 corresponding to the storage volume via a communication interface identified by a value of the communication interface identification information field 3613.

The usage field 3615 and the free capacity field 3616 store a value of a capacity in use and a value of a free capacity of a storage volume identified by a value of the storage volume identification information field 3611.

The data example in the case in which the host computer 300 is mounted with a virtual computer management program of a hypervisor type, i.e., a storage volume is a dedicated file system for managing a virtual computer is explained above. On the other hand, when the host computer 300 is mounted with a virtual computer management program of a host type, usually, since a virtual environment is constructed on an OS, the storage volume is shared with a physical computer. Therefore, a value of the usage field 3615 is a total of a storage capacity used by the virtual computer and a storage capacity used by the physical computer.

Figure 12:
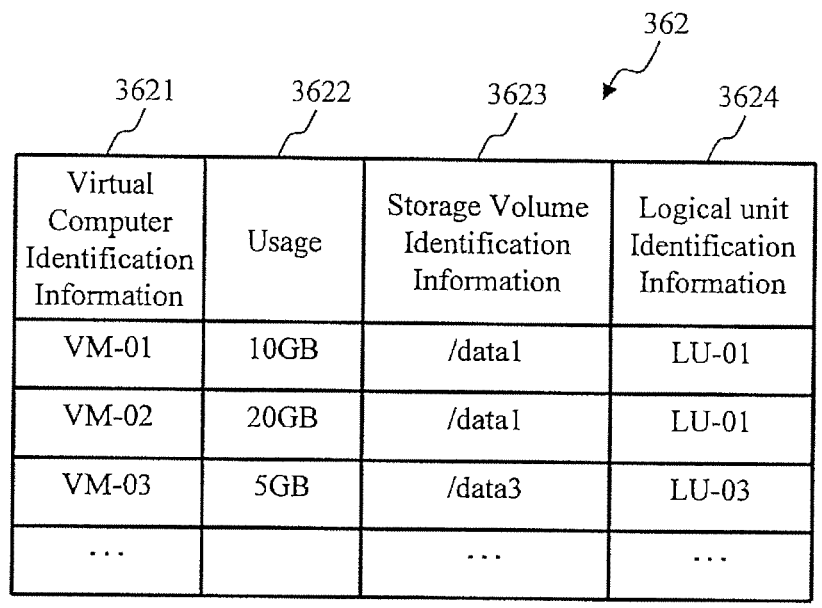
FIG. 12 is a diagram of the configuration and a data example of a virtual computer storage extend management information 362 stored by the host computer 300.

FIG. 12 is a diagram showing the configuration and a data example of the virtual computer storage extent management information 362 stored by the host computer 300. The virtual computer storage extent management information 362 is information indicating a correspondence relation between a storage extent on the host computer 300 used by the virtual computer 400 and a storage extent provided by the storage subsystem 100. The virtual computer storage extent management information 362 includes a virtual computer identification information field 3621, a usage field 3622, a storage volume identification information field 3623, and a logical unit identification information field 3624.

The virtual computer identification information field 3621 stores an identifier of the virtual computer 400. The storage volume identification information field 3623 and the logical unit identification information field 3624 correspond to the storage volume identification information field 3611 and the logical unit identification information field 3614 of the host computer storage extent configuration information 361. The usage field 3622 stores a capacity value of a storage extent allocated to the virtual computer 400.

Figure 13:
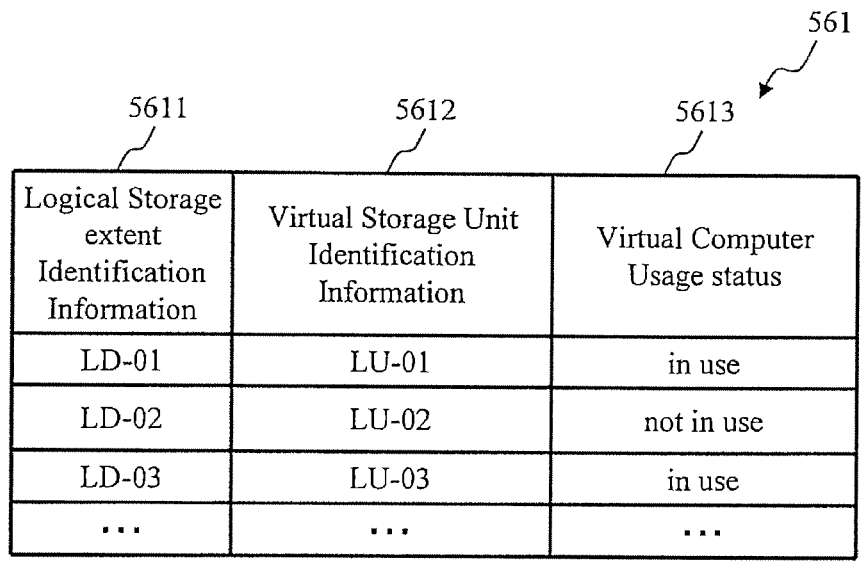
FIG. 13 is a diagram showing the configuration and a data example of a virtual computer usage status management information 561 stored by the storage management computer 500.

FIG. 13 is a diagram showing the configuration and a data example of the virtual computer usage status management information 561 stored by the storage management computer 500. The virtual computer usage status management information 561 is information indicating whether the virtual computer 400 is using the logical storage extent 11 provided by the storage subsystem 100. The virtual computer usage status management information 561 includes a logical storage extent identification information field 5611, a virtual storage unit identification information field 5612, and a virtual computer usage status field 5613.

The logical storage extent identification information field 5611 and the virtual storage unit identification information field 5612 respectively store an identifier of the logical storage extent 11 and an identifier of the logical unit 10. The virtual computer usage status field 5613 stores a value indicating whether the logical unit 10 identified by a value of the virtual storage unit identification information field 5612 is used by the virtual computer 400.

The storage management computer 500 retrieves a value recorded in the logical unit identification information 3624 of the virtual computer storage extent management information 362 among values of the virtual storage unit identification information field 5612 and determines whether the logical unit 10 is used. When the logical unit 10 is used, the storage management computer 500 records a value such as "in use". When the logical unit 10 is not used, the storage management computer 500 records a value such as "not in use". Update timing for the control information is explained later.

FIG. 14 is a diagram showing the configuration and a data example of the virtual computer management information 7601 stored by the virtual environment management computer 700. The virtual computer management information 7601 is information for managing identification information such as a network address and an OS license allocated to the virtual computer 400. The virtual environment management computer 700 manages, using the information, an IP address, a MAC address, virtual communication interface identification information, and OS license identification information allocated to the virtual computer 400. These kinds of identification information are uniquely allocated to the virtual computer 400 when the virtual computer 400 is created.

The virtual computer management information 7601 includes a virtual computer identification information field 76011, a host name field 76012, a MAC address field 76013, a virtual communication interface identification information field 76014, an IP address field 76015, and a license identification information field 76016.

When the virtual environment management computer 700 creates the virtual computer 400 identified by a value of the virtual computer identification information field 76011, the virtual environment management computer 700 creates a new record of the virtual computer management information 7601. The virtual environment management computer 700 allocates a host name, a MAC address, virtual communication interface identification information, and an IP address to the virtual computer 400 and records values of the host name, the MAC address, the virtual communication interface identification information, and the IP address respectively in the host name field 76012, the MAC address field 76013, the virtual communication interface identification information field 76014, and the IP address field 76015. The virtual environment management computer 700 acquires an OS license of the virtual computer 400 created anew from the license management computer 820 and stores identification information of the virtual computer 400 in the license identification information field 76016.

A MAC address can be used to identify a communication interface for Ethernet, whereas the virtual communication interface identification information can be used to identify a communication interface for Fibre Channel. The MAC address and the virtual communication interface identification information may be allocated to each of the MAC addresses and the virtual communication interfaces respectively.

The virtual environment management computer 700 uniquely allocates respective kinds of identification information to the virtual computer 400 created anew. Therefore, the identification information recorded in the fields cannot be allocated to another virtual computer 400 anew. When the virtual environment management computer 700 deletes the virtual computer 400, the virtual environment management computer 700 deletes a record corresponding to the virtual computer 400 in the virtual computer management information 7601. Consequently, the identification information allocated to the virtual computer 400 is released and can be allocated to the virtual computer 400 created anew.

FIG. 15 is a diagram showing the configuration and a data example of the IP address management information 7602 stored by the virtual environment management computer 700. The IP address management information 7602 is information for managing an IP address that can be allocated to the virtual computer 400. The IP address management information 7602 includes an IP address field 76021, an allocation status field 76022, and an expiration date field 76023.

The IP address field 76021 stores an IP address that can be allocated to the virtual computer 400. The allocation status field 76022 corresponding to the IP address field 76021 stores identification information of the virtual computer 400 to which the IP address is allocated. When an expiration date of use of the IP address is determined, the expiration date field 76023 stores date and time and the like of the expiration date. When there is no expiration date, the expiration date field 76023 stores "Null".

FIG. 16 is a diagram of the configuration and a data example of the MAC address management information 7603 stored by the virtual environment management computer 700. The MAC address management information 7603 is information for managing an MAC address that can be allocated to the virtual computer 400. The MAC address management information 7603 includes a MAC address field 76031, an allocation status 76032, and an expiration date field 76033.

The MAC address field 76031 stores a MAC address that can be allocated to the virtual computer 400. The allocation status field 76032 corresponding to the MAC address field 76031 stores identification information of the virtual computer 400 to which the MAC address is allocated. When an expiration date of use of the MAC address is determined, the expiration date field 76033 stores date and time and the like of the expiration date. When there is no expiration date, the expiration date field 76033 stores "Null".

FIG. 17 is a diagram showing the configuration and a data example of the virtual communication interface management information 7604 stored by the virtual environment management computer 700. The virtual communication interface management information 7604 is information for managing virtual communication interface identification information that can be allocated to the virtual computer 400. The virtual communication interface management information 7604 includes a virtual communication interface identification information field 76041, an allocation status field 76042, and an expiration date field 76043.

The virtual communication interface identification information field 76041 stores virtual communication interface identification information that can be allocated to the virtual computer 400. The allocation status field 76042 corresponding to the virtual communication interface identification information field 76041 stores identification information of the virtual computer 400 to which the communication interface identification information is allocated. When an expiration date of use of the virtual communication interface identification information is determined, the expiration date field 76043 stores date and time of the expiration date. When there is no expiration date, the expiration date field 76043 stores "Null".

FIG. 18 is a diagram showing the configuration and a data example of the user management information 7605 stored by the virtual environment management computer 700. The user management information 7605 is information that stores a correspondence relation between a user account on the OS of the virtual computer 400 and a network domain to which the user account belongs. The user management information 7605 includes a virtual computer identification information field 76051, a user identification information field 76052, and a domain field 76053.

The virtual computer identification information field 76051 stores an identifier of the virtual computer 400. The user identification information field 76052 stores a user account name on the OS of the virtual computer 400. The domain field 76053 stores a network domain name to which the user account belongs.

FIG. 19 is a diagram showing the configuration and a data example of the license management information 8261 stored by the license management computer 820. The license management information 8261 is information for managing a use permission status of an OS license that can be used by the virtual computer 400. The license management information 8261 includes a license identification information field 82611, a use permission field 82612, and an expiration date field 82613.

The license identification information field 82611 stores an identifier of the OS license that can be used by the virtual computer 400. The use permission field 82612 stores a value indicating whether the OS license can be used. When the OS license can be used, the use permission field 82612 stores "enable". When the OS license cannot be used, the use permission field 82612 stores "disable". The expiration date field 82613 stores an expiration date of use of the OS license. When the OS license can be used, the expiration date field 82613 stores date and time of the expiration date of use. When the OS license cannot be used, the expiration date field 82613 stores "Null".

FIG. 20 is a diagram showing the configuration and a data example of the domain management information 8361 stored by the domain management computer 830. The domain management information 8361 is information for managing a computer and a user account registered in a network domain. An example in which information for managing the computer and information for managing the user account are separately formed is explained. However, these pieces of information may be integrally formed.

The domain management information 8361 includes a domain field 83611, a computer identification information field 83612, a domain field 83613, and a user identification information field 83614.

The domain fields 83611 and 83613 store network domain names managed by the domain management computer 830. The computer identification information field 83612 stores a host name of the host computer 300 belonging to a network domain identified by a value of the domain field 83611. The user identification information field 83614 stores a user account name belonging to a network domain identified by a value of the domain field 83613.

FIG. 21 is a screen image diagram of the operation screen 790 provided the virtual environment management computer 700. An administrator who uses the virtual environment management computer 700 can instruct creation and deletion of the virtual computer 400 via the operation screen 790.

An operation screen 790a indicates an example of a virtual computer creation screen. On the screen, a capacity of a storage extent that can be used by the virtual computer 400, the number of virtual computers to be created, and a host name can be designated. An operation screen 790b indicates an example of a virtual computer deletion screen. On the screen, a list of the created virtual computers 400 is displayed and the virtual computer 400 desired to be deleted can be selected out of the virtual computers 400.

Figure 22:
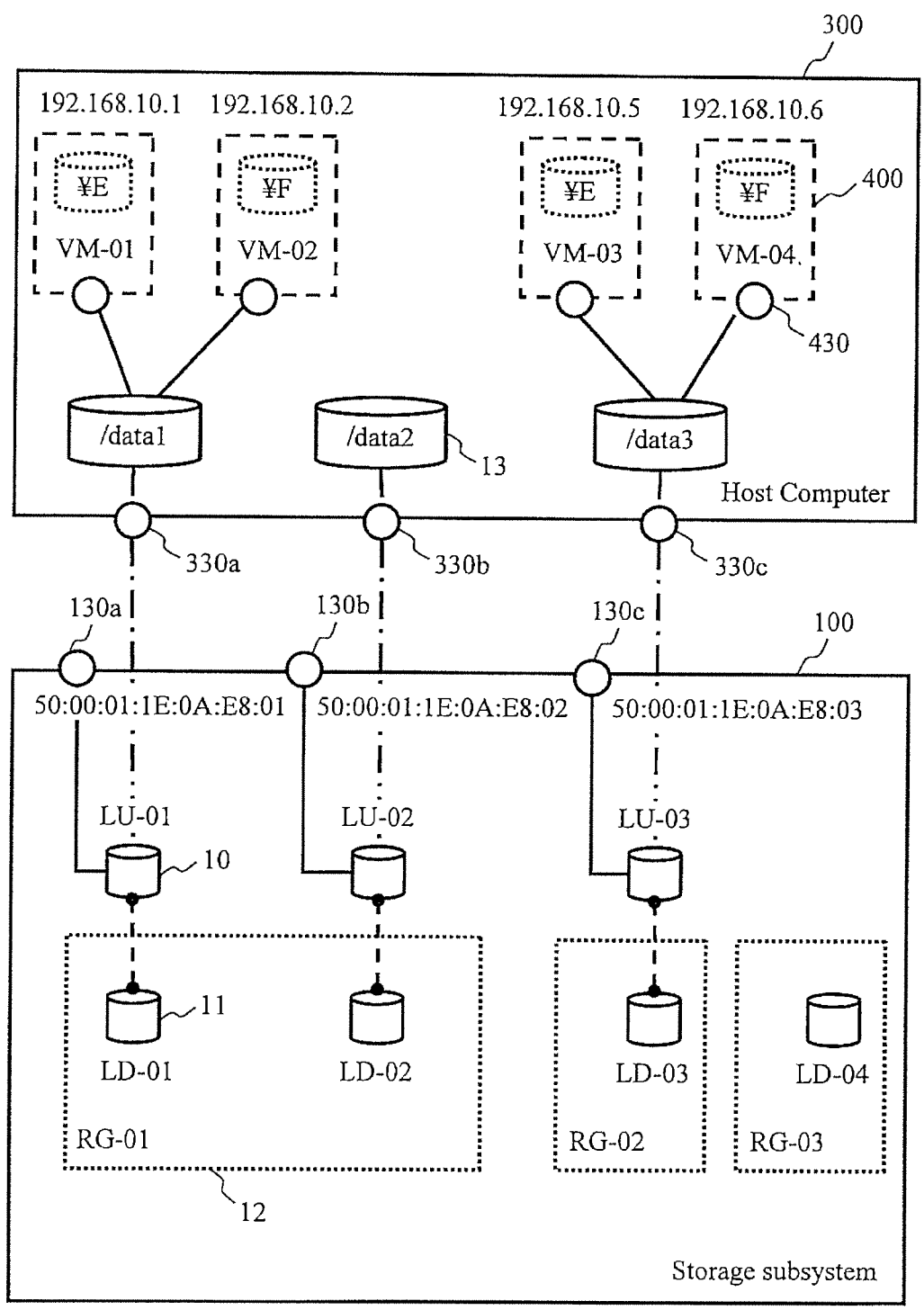
FIG. 22 is a diagram representing, as logical connection diagram, a configuration example of the host computer 300 and the storage subsystem 100 illustrated in FIGS. 9 to 14.

FIG. 22 is a diagram representing, using a logical connection diagram, a configuration example of the host computer 300 and the storage subsystem 100 illustrated in FIGS. 9 to 14. Connection relations are explained below.

(FIG. 22: Connection Relation 1)

The storage subsystem 100 configures a RAID group 12 using plural storage devices. The RAID group 12 includes the logical storage extents 11. For example, logical storage extents "LD-01" and "LD-02" are included in a RAID group "RG-01".

(FIG. 22: Connection Relation 2)

The logical units 10 are associated with the logical storage extents 11. Further, the data I/O interfaces 130 are associated with the logical units 10. In the figure, the data I/O interface 130 "50:00:01:1E:0A:E8:01", a logical unit "LU-01", and the logical storage extent "LD-01" are associated.

(FIG. 22: Connection Relation 3)

The logical units 10 are associated with the storage volumes 13 on the host computer 300. The data I/O interface "50:00:01:1E:0A:E8:01" and the logical unit "LU-01" are associated with a storage volume "/data1" on the host computer 300.

(FIG. 22: Connection Relation 4)

The virtual computers 400 are created on the storage volumes 13. In the figure, virtual computers "VM-01" and "VM-02" are configured on the storage volume "/data1" on the host computer 300.

Figure 23:
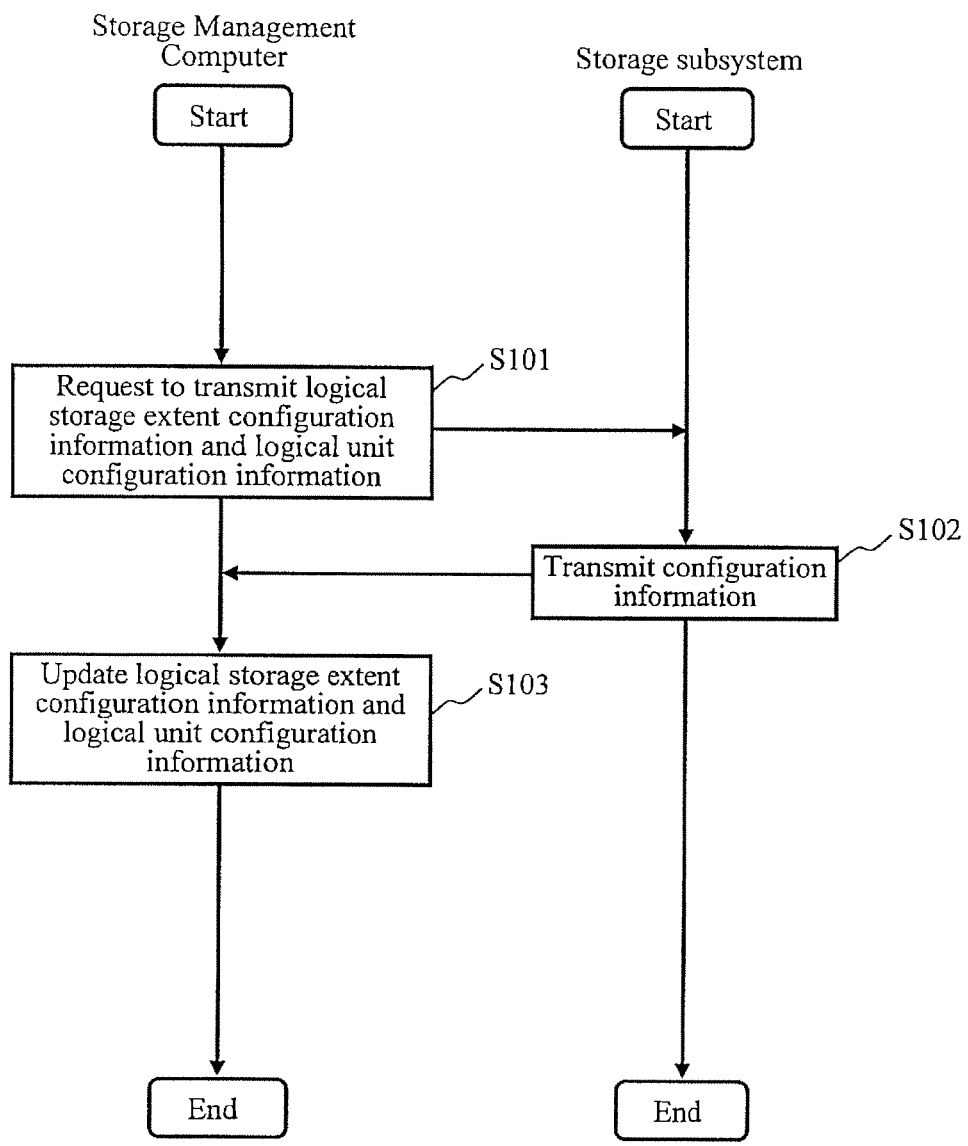
FIG. 23 is a flowchart for explaining a processing procedure for updating the logical storage extent configuration information 161 and the logical unit configuration information 162 stored by the storage management computer 500.

FIG. 23 is a flowchart for explaining a processing procedure for updating the logical storage extent configuration information 161 and the logical unit configuration information 162 stored by the storage management computer 500. According to the processing, the storage management computer 500 can maintain the logical storage extent configuration information 161 and the logical unit configuration information 162 in latest states. Steps shown in FIG. 23 are explained below.

(FIG. 23: Step S101)

The storage extent management program 163 of the storage management computer 500 requests the storage subsystem 100 to transmit the logical storage extent configuration information 161 and the logical unit configuration information 162.

(FIG. 23: Step S102)

The storage extent management program 163 of the storage subsystem 100 receives the request in step S101 from the storage management computer 500 and transmits the logical storage extent configuration information 161 and the logical unit configuration information 162 to the storage management computer 500.

(FIG. 23: Step S103)

The storage extent management program 163 of the storage management computer 500 receives the logical storage extent configuration information 161 and the logical unit configuration information 162 from the storage subsystem 100 and updates these kinds of information stored by the storage subsystem management computer 500.

Figure 24:
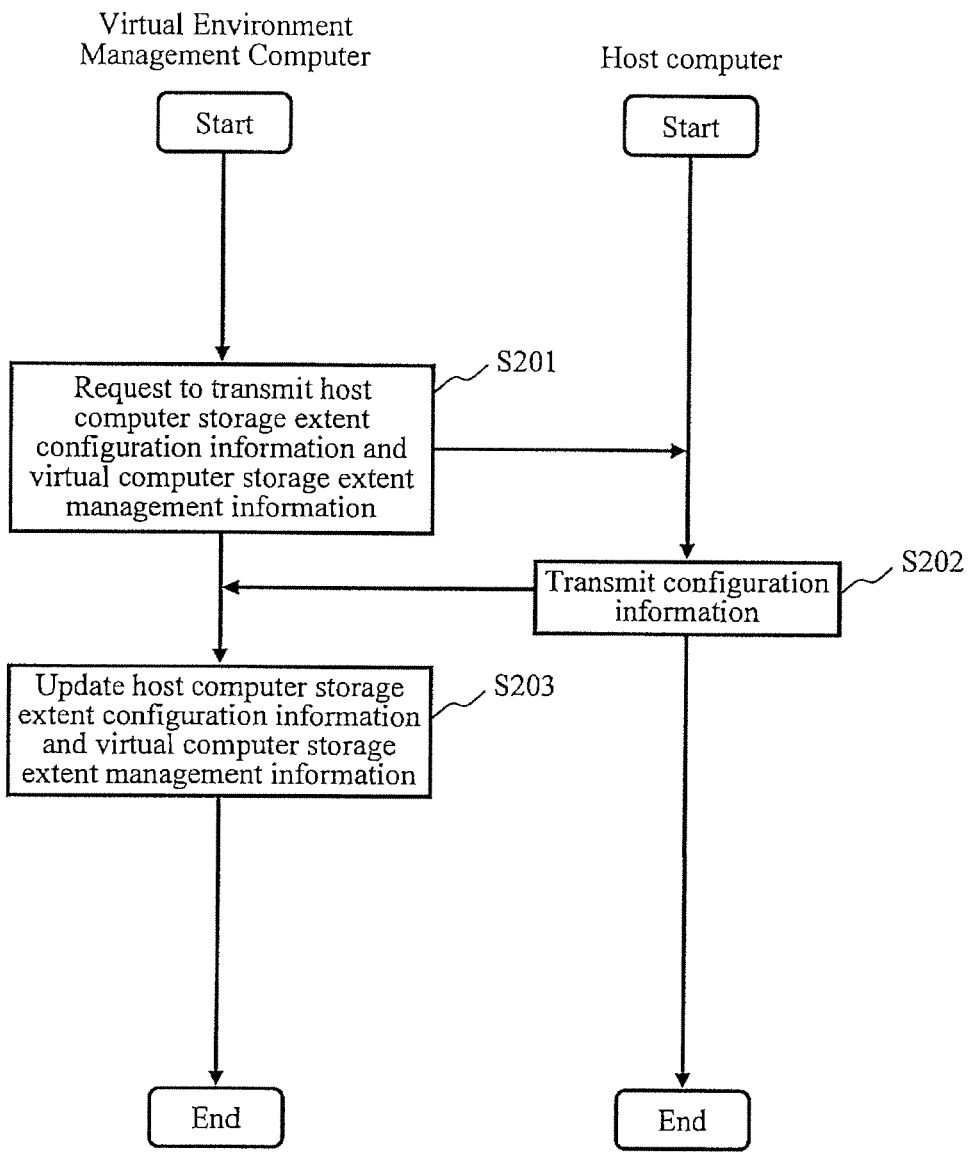
FIG. 24 is a flowchart for explaining a processing procedure for updating the host computer storage extent configuration information 361 and the virtual computer storage extent management information 362 stored by the virtual environment management computer 700.

FIG. 24 is a flowchart for explaining a processing procedure for updating the host computer storage extent configuration information 361 and the virtual computer storage extent management information 362 stored by the virtual environment management computer 700. According to the processing, the virtual environment management computer 700 can maintain the host computer storage extent configuration information 361 and the virtual computer storage extent management information 362 in latest states. Steps shown in FIG. 24 are explained below.

(FIG. 24: Step S201)

The virtual computer storage extent management program 365 of the virtual environment management computer 700 requests the host computer 300 to transmit the host computer storage extent configuration information 361 and the virtual computer storage extent management information 362.

(FIG. 24: Step S202)

The virtual computer storage extent management program 365 of the host computer 300 receives the request in step S201 from the virtual environment management computer 700 and transmits the host computer storage extent configuration information 361 and the virtual computer storage extent management information 362 to the virtual environment management computer 700.

(FIG. 24: Step S203)

The virtual computer storage extent management program 365 of the virtual environment management computer 700 receives the host computer storage extent configuration information 361 and the virtual computer storage extent management information 362 from the host computer 300 and updates these kinds of information stored by the virtual environment management computer 700.

Figure 25:
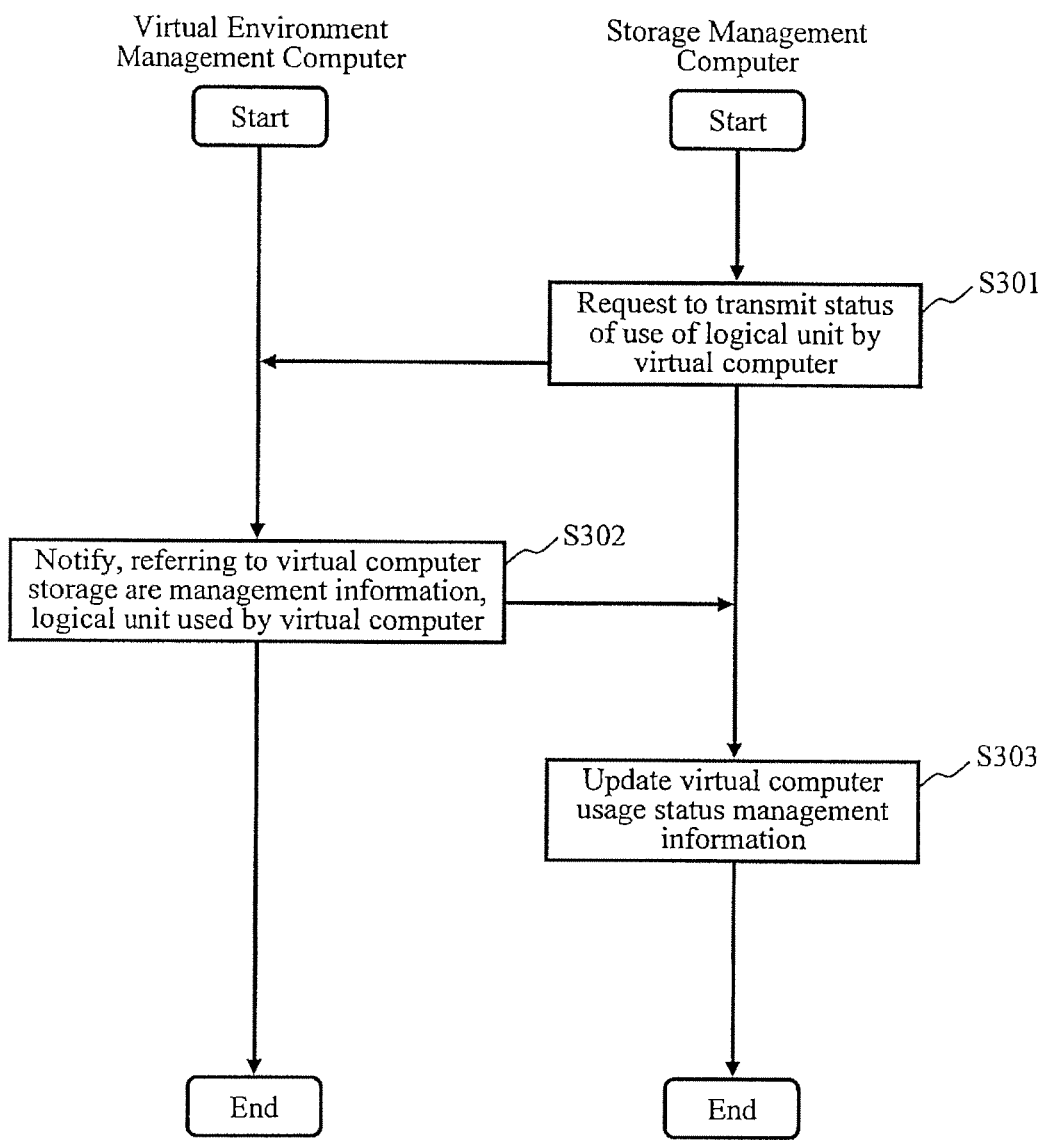
FIG. 25 is a flowchart for explaining a processing procedure for updating the virtual computer usage status management information 561 stored by the storage management computer 500.

FIG. 25 is a flowchart for explaining a processing procedure for updating the virtual computer usage status management information 561 stored by the storage management computer 500. According to the processing, the storage management computer 500 can maintain the virtual computer usage status management information 561 in a latest state. Steps shown in FIG. 25 are explained below.

(FIG. 25: Step S301)

The virtual computer usage status management program 566 of the storage management computer 500 requests the virtual environment management computer 700 to notify the logical unit 10 used by the virtual computer 400.

(FIG. 25: Step S302)

The storage management cooperation program 7607 of the virtual environment management computer 700 notifies, referring to the virtual computer storage extent management information 362, the storage management computer 500 of the identification information of the logical unit 10 recorded in the logical unit identification information field 3624.

(FIG. 25: Step S303)

The virtual computer usage status management program 566 of the storage management computer 500 receives the identification information of the logical unit 10 used by the virtual computer 400 and updates the virtual computer usage status management information 561 stored by the storage management computer 500.

Figure 26:
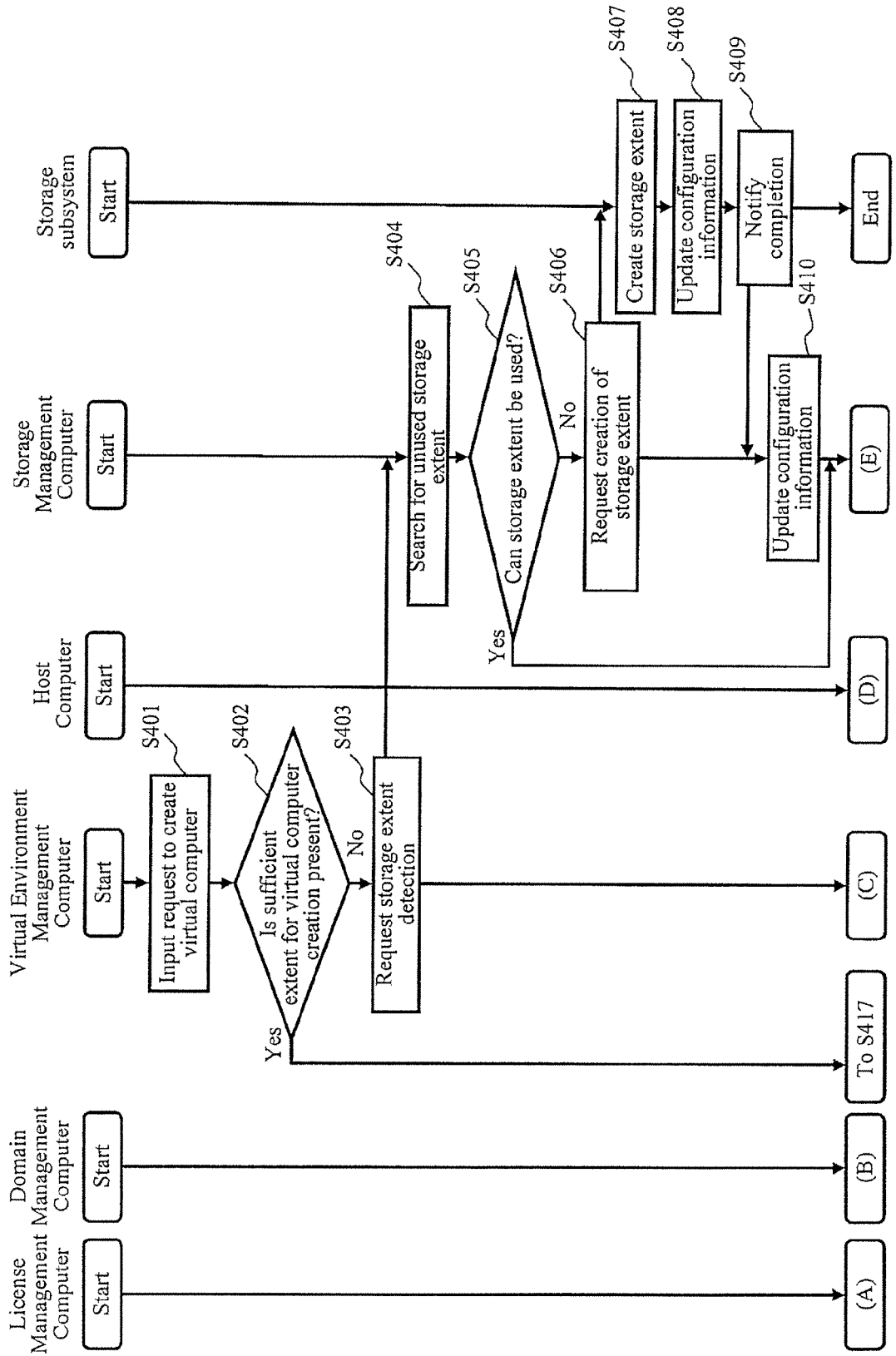
FIG. 26 is a sequence chart for explaining a procedure in which the host computer 300 creates the virtual computer 400.
Figure 27:
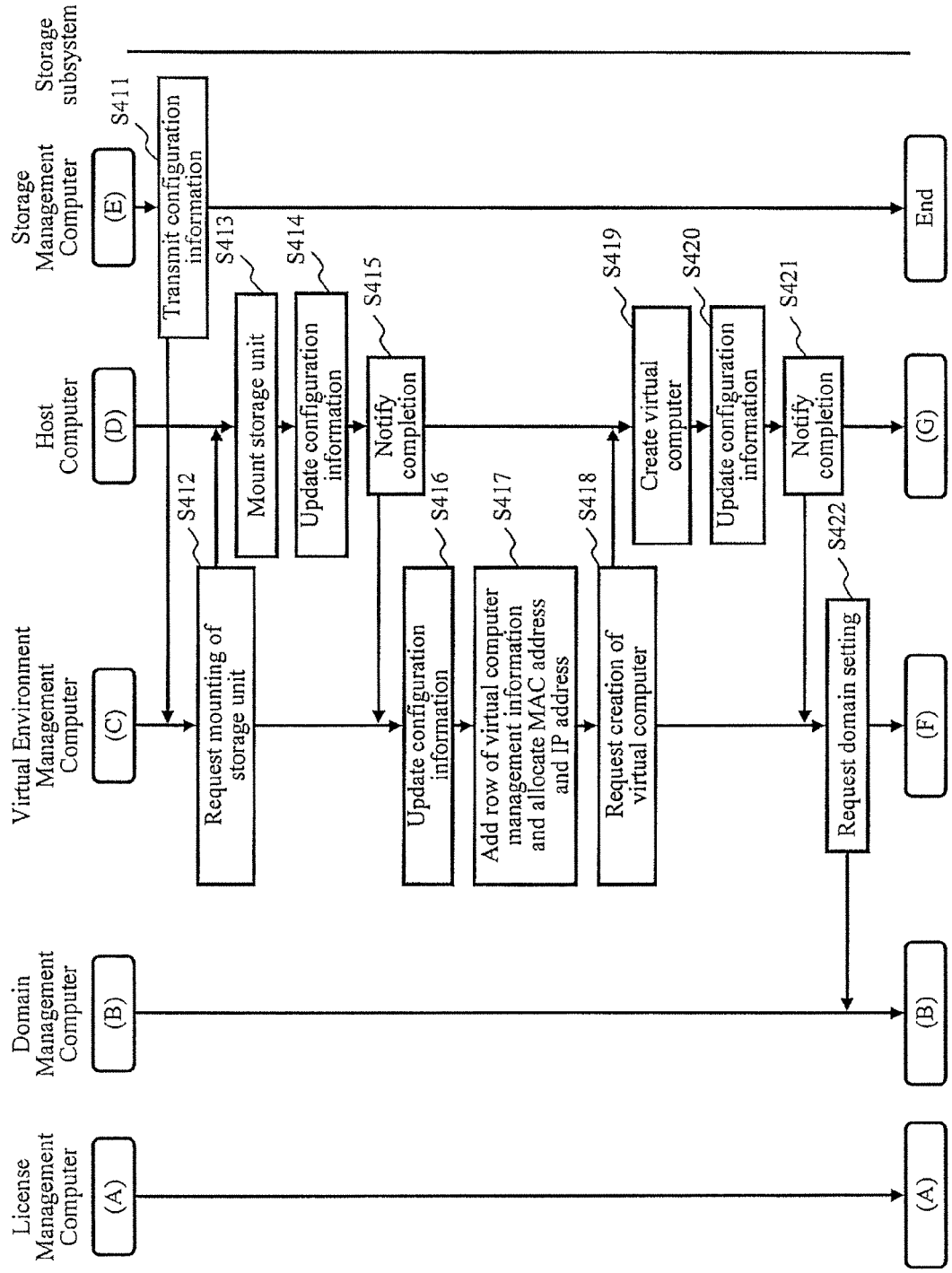
FIG. 27 is a sequence chart for explaining the procedure in which the host computer 300 creates the virtual computer 400.
Figure 28:
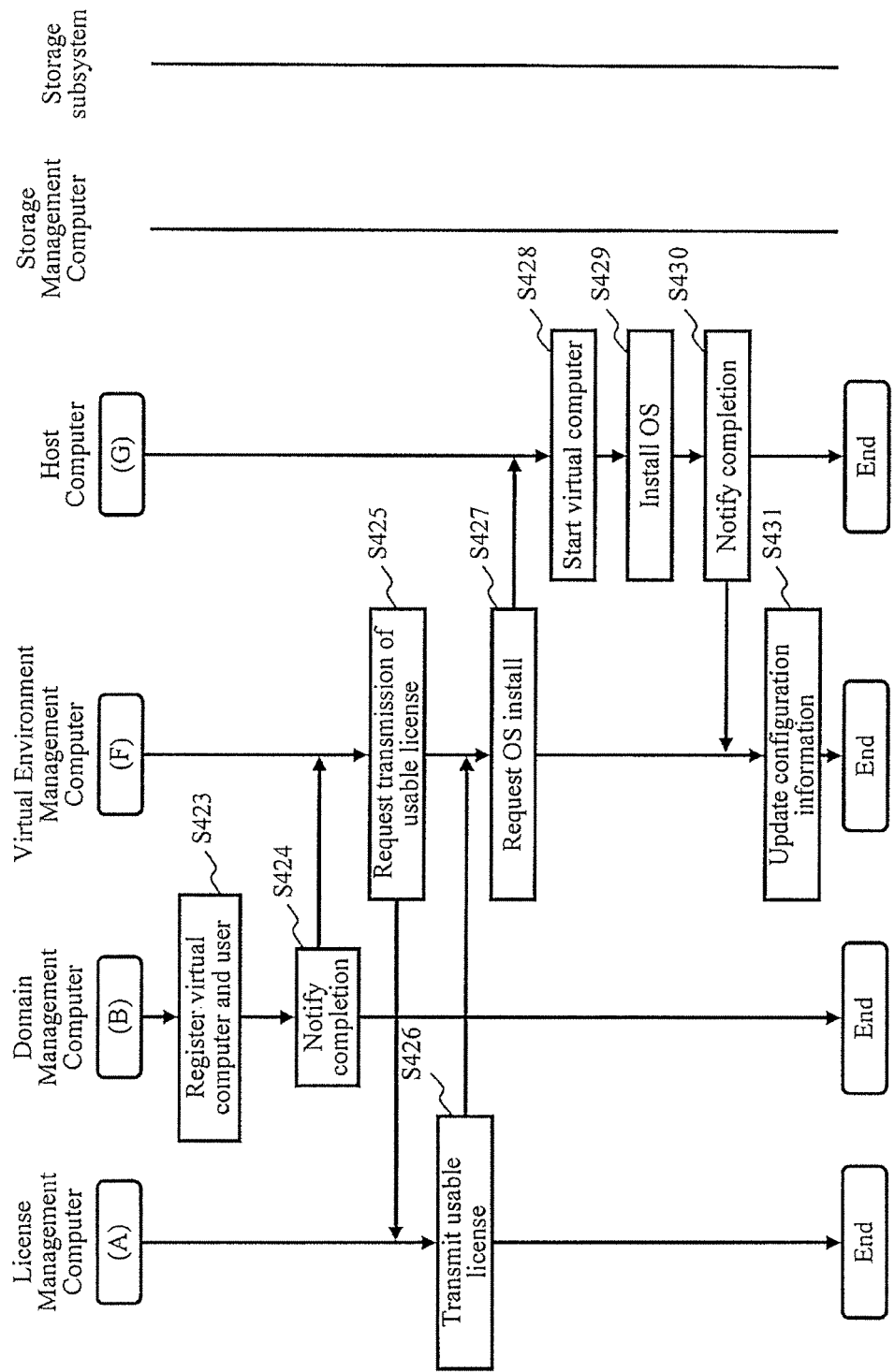
FIG. 28 is a sequence chart for explaining the procedure in which the host computer 300 creates the virtual computer 400.

FIGS. 26 to 28 are sequence charts for explaining a procedure in which the host computer 300 creates the virtual computer 400. Although FIGS. 26 to 28 are a series of processing procedures, the processing procedure is divided into the three drawings for convenience of description.

In order to set the virtual computer 400 in a usable state, it is necessary not only to create the virtual computer 400 but also set a network address, cause the virtual computer 400 to participate in a network domain, and acquire an OS license. However, in the past, when the virtual computer 400 is created anew, cooperation between external computers such as the domain management computer 830 and the license management computer 820 and the host computer 300 is not realized. Therefore, in the first embodiment, a procedure for causing the external computers and the host computer 300 to cooperate with each other is provided. Steps are explained below.

(FIG. 26: Step S401)

The administrator inputs the number of virtual computers 400 to be created, a disk capacity, and the like to the operation screen 790 of the virtual environment management computer 700. One or more of items input to the operation screen 790 may be input by the administrator. Alternatively, a predefined value stored by the virtual environment management computer 700 in advance may be used.

(FIG. 26: Step S402)

When the virtual computer creation indication program 7608 of the virtual environment management computer 700 receives the input in step S401, the virtual computer creation indication program 7608 determines, referring to the free capacity field 3616 of the host computer storage extent configuration information 361, whether a sufficient storage extent for creating the virtual computer 400 is present on the storage subsystem 100. When the sufficient storage extent is present, the virtual computer creation indication program 7608 skips to step S417. When the sufficient storage extent is absent, the virtual computer creation indication program 7608 proceeds to step S403.

(FIG. 26: Step S403)

The storage management cooperation program 7607 of the virtual environment management computer 700 notifies the storage management computer 500 of a storage capacity necessary for creating the virtual computer 400 and requests the storage management computer 500 to detect a storage extent having a capacity equal to or larger than the capacity.

(FIG. 26: Step S404)

When the storage extent management program 163 of the storage management computer 500 receives the request in step S403 from the virtual environment management computer 700, the storage extent management program 163 searches for the logical unit 10 recorded as "not in use" referring to the virtual computer usage status field 5613 of the virtual computer usage status management information 561.

(FIG. 26: Step S405)

When the logical unit 10 having a capacity equal to or larger than the capacity designated in step S403 is present, the storage extent management program 163 skips to step S411.

When the logical unit 10 having a capacity equal to or larger than the capacity designated in step S403 is absent, the storage extent management program 163 proceeds to step S406.

(FIG. 26: Step S406)

The storage extent management program 163 of the storage management computer 500 requests the storage subsystem 100 to create the logical unit 10 having the capacity designated in step S403.

(FIG. 26: Step S407)

When the storage extent creating program 164 of the storage subsystem 100 receives the request in step S406 from the storage management computer 500, the storage extent creating program 164 searches for, referring to the logical storage extent configuration information 161 and the logical unit configuration information 162, the logical storage extent 11 having a capacity equal to or larger than the designated capacity and not associated with the logical unit 10. When the logical storage extent 11 matching the condition is present, the storage extent creating program 164 associates the logical storage extent 11 with the logical unit 10. When the logical storage extent 11 itself matching the condition is absent, the storage extent creating program 164 creates anew the logical storage extent 11 having the designated capacity.

(FIG. 26: Steps S408 and S409)

After creating the logical storage extent 11, the storage extent management program 163 updates the logical storage extent configuration information 161 and the logical unit configuration information 162 (step S408) and transmits configuration information of the logical unit 10 created anew to the storage management computer 500 together with completion notification.

(FIG. 26: Step S410)

When the storage extent management program 163 of the storage management computer 500 receives the completion notification in step S409 from the storage subsystem 100, the storage extent management program 163 updates the logical storage extent configuration information 161, the logical unit configuration information 162, and the virtual computer usage status management information 561 on the basis of the notification from the storage subsystem 100. In step S409, instead of transmitting the configuration information together with the completion notification, the storage extent management program 163 may execute the processing procedure shown in FIG. 23 at a point when the completion notification is received from the storage subsystem 100.

(FIG. 27: Step S411)

The storage extent management program 163 of the storage subsystem 100 transmits the configuration information of the logical unit 10 created anew to the virtual environment management computer 700.

(FIG. 27: Step S412)

When the virtual computer creation indication program 7608 of the virtual environment management computer 700 receives the configuration information of the logical unit 10 from the storage subsystem 100, the virtual computer creation indication program 7608 designates the logical unit 10 created anew by the storage subsystem 100 and instructs the host computer 300 to mount the logical unit 10.

(FIG. 27: Steps S413 and S414)

The virtual computer creating program 363 of the host computer 300 receives the instruction to mount the logical unit 10, the virtual computer creating program 363 mounts the designated logical unit 10 (S413). The virtual computer storage extent management program 365 updates the host computer storage extent configuration information 361 (step S414).

(FIG. 27: Step S415)

The virtual computer storage extent management program 365 of the host computer 300 transmits configuration information of a storage volume mounted anew to the virtual environment management computer 700 together with completion notification.

(FIG. 27: Step S416)

When the virtual computer storage extent management program 365 of the virtual environment management computer 700 receives the completion notification from the host computer 300, the virtual computer storage extent management program 365 updates the host computer storage extent configuration information 361. In step S415, instead of transmitting the configuration information together with the completion notification, the virtual computer storage extent management program 365 may execute the processing procedure shown in FIG. 24 at a point when the completion notification is received from the host computer 300.

(FIG. 27: Step S417)

The virtual computer storage extent management program 365 of the virtual environment management computer 700 adds a new record equivalent to the virtual computer 400 created anew to the virtual computer management information 7601. The virtual computer storage extent management program 365 acquires values of the IP address field 76021, the MAC address field 76031, and the virtual communication interface identification information field 76041, the allocation status fields (76022, 76032, and 76042) of which are "Null", referring to the IP address management information 7602, the MAC address management information 7603, and the virtual communication interface management information 7604, respectively. The virtual computer storage extent management program 365 sets the acquired respective kinds of identification information in the IP address field 76015, the MAC address field 76013, and the virtual communication interface identification information field 76014 of the virtual computer management information 7601. Further, virtual computer storage extent management program 365 sets an identifier of the virtual computer 400 created anew in the allocation status (76022, 76032, and 76042) of the IP address management information 7602, the MAC address management information 7603, an the virtual communication interface management information 7604, respectively. According to this step, it is possible to manage which virtual computer 400 is using the identification information and prevent redundant allocation.

(FIG. 27: Step S418)

The virtual computer creation indication program 7608 of the virtual environment management computer 700 requests the host computer 300 to designate a storage extent capacity and the number of virtual computers to be created and create the virtual computer 400.

(FIG. 27: Step S419)

When the virtual computer creating program 363 of the host computer 300 receives a request to create the virtual computer 400 from the virtual environment management computer 700, the virtual computer creating program 363 virtualizes the arithmetic processing device 310, the storage device 320, the cache memory 350, and the like of the host computer 300 and creates the virtual computer 400 on the logical unit 10 mounted in step S413.

(FIG. 27: Steps S420 and S421)

The virtual computer storage extent management program 365 of the host computer 300 updates the virtual computer storage extent management information 362 (S420). The virtual computer creating program 363 of the host computer 300 transmits completion notification to the virtual environment management computer 700 (S421). At this point, the host computer 300 may transmit the virtual computer storage extent management information 362 to the virtual environment management computer 700 together with the completion notification or may execute the processing procedure shown in FIG. 24 after the virtual environment management computer 700 receives the completion notification.

(FIG. 27: Step S422)

When the identification information management program 7610 of the virtual environment management computer 700 receives the completion notification from the host computer 300, the identification information management program 7610 requests the domain management computer 830 to register the created virtual computer 400 in a network domain. When a user account on an OS that can access the virtual computer 400 is created anew, the identification information management program 7610 requests the domain management computer 830 to register the account in the network domain as well.

(FIG. 28: Steps S423 and S424).

When the domain management computer 830 receives the domain registration request from the virtual environment management computer 700, the domain management computer 830 records a host name of the virtual computer 400 in the computer identification information field 83612 and records a user account name in the user identification information field 83614 (S423). The domain management computer 830 causes the virtual computer 400 and the user account to participate in the network domain. The domain management computer 830 transmits completion notification to the virtual environment management computer 700 (S424).

(FIG. 28: Step S425)

When the identification information management program 7610 of the virtual environment management computer 700 receives the completion notification from the domain management computer 830, the identification information management program 7610 requests the license management computer 820 to transmit a usable license of the OS.

(FIG. 28: Step S426)

When the license management computer 820 receives the request to transmit the usable license from the virtual environment management computer 700, the license management computer 820 transmits, referring to the license management information 8261, a license recorded as "enable" in the use permission field 820102 to the virtual environment management computer 700 and sets the field as "disable". When there is an upper limit in the number of computers to which licenses are allocated, the license management computer 820 may count the number of times of request in step S425 and record the number of computers to which licenses are allocated. This makes it possible to change the use permission field 82612 from "enable" to "disable" at a point when the number of computers to which licenses are allocated reaches the upper limit.

(FIG. 28: Step S427)

When the virtual environment management computer 700 receives the usable license from the license management computer 820, the virtual environment management computer 700 designates the license acquired in step S426 and requests the host computer 300 to install the OS.

(FIG. 28: Steps S428 to S430)

When the virtual computer creating program 363 of the host computer 300 receives the OS install instruction from the virtual environment management computer 700, the virtual computer creating program 363 starts the virtual computer 400 created in step S419 (S428). The virtual computer creating program 363 installs the OS in the started virtual computer 400 (S429). The virtual computer creating program 363 transmits completion notification to the virtual environment management computer 700 (S430).

(FIG. 28: Step S431)

The identification information management program 7610 of the virtual environment management computer 700 receives the completion notification from the host computer 300, the identification information management program 7610 updates the virtual computer management information 7601 and the user management information 7605. The virtual computer management information 7601 may be updated between step S426 and step S427. The user management information 7605 may be updated between step S424 and step S425.

Figure 29:
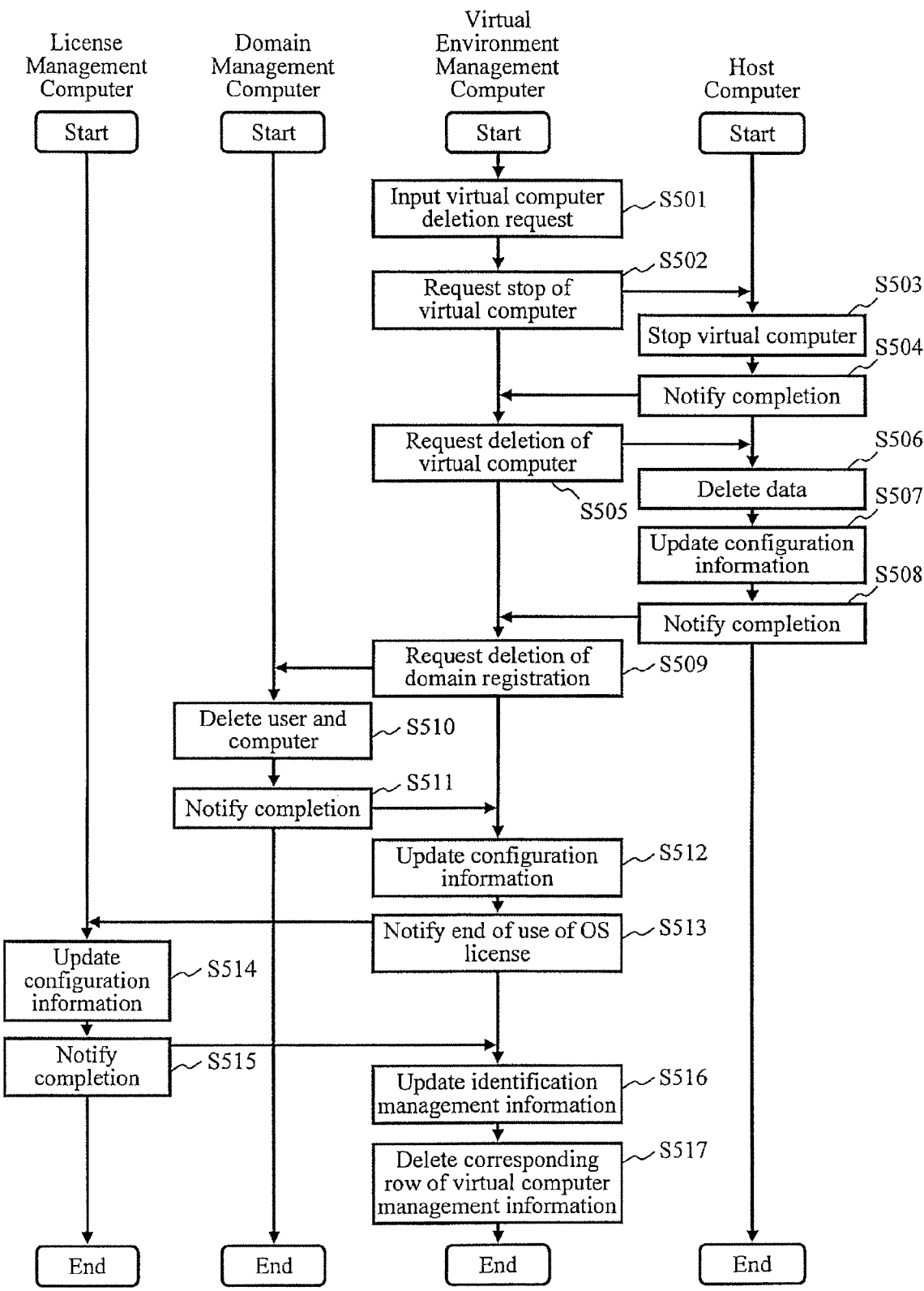
FIG. 29 is a flowchart for explaining a processing procedure in which the host computer 300 deletes the virtual computer 400.

FIG. 29 is a flowchart for explaining a processing procedure in which the host computer 300 deletes the virtual computer 400. Steps shown in FIG. 29 are explained below.

(FIG. 29: Steps S501 and S502)

The administrator designates the virtual computer 400 to be deleted on the operation screen 790 of the virtual environment management computer 700 (S501). The virtual computer deletion indication program 7609 of the virtual environment management computer 700 requests the host computer 300 to stop the virtual computer 400 designated in step S501 (S502).

(FIG. 29: Steps S503 and S504)

When the host computer 300 receives the request to stop the virtual computer 400 from the virtual environment management computer 700, the host computer 300 stops the designated virtual computer 400 (S503) and transmits completion notification to the virtual environment management computer 700 (S504).

(FIG. 29: Step S505)

When the virtual computer deletion indication program 7609 of the virtual environment management computer 700 receives the completion notification from the host computer 300, the virtual computer deletion indication program 7609 requests the host computer 300 to delete the virtual computer 400.

(FIG. 29: Step S506)

When the virtual computer deleting program 364 of the host computer 300 receives the request to delete the virtual computer 400 from the virtual environment management computer 700, the virtual computer deleting program 364 specifies a storage volume in which the virtual computer 400 is stored referring to the virtual computer storage extent management information 362 and deletes the virtual computer 400 in the storage volume.

(FIG. 29: Steps S507 and S508)

The virtual computer storage extent management program 365 of the host computer 300 updates the virtual computer storage extent management information 362 (step S507) and transmits completion notification to the virtual environment management computer 700 (step S508).

(FIG. 29: Step S509)

When the identification information management program 7610 of the virtual environment management computer 700 receives the completion notification from the host computer 300, the identification information management program 7610 specifies, referring to the user management information 7605, the virtual computer 400 set as a deletion target and a user account corresponding to the virtual computer 400 and requests the domain management computer 830 to delete registration of the virtual computer 400 and the user account. The user account is deleted when the user account is not used in the virtual computer 400 other than the virtual computer 400 set as the deletion target. The user account is not deleted in this step when the user account is used in the virtual computer 400 other than the virtual computer 400 set as the deletion target.

(FIG. 29: Steps S510 and S511)

When the domain management computer 830 receives a request to delete the registration from the virtual computer management computer 700, the domain management computer 830 deletes records corresponding to the virtual computer 400 and the user account from the domain management information 8361 (S510) and transmits completion notification to the virtual environment management computer 700 (S511). The domain management computer 830 may delete a user account that should not be deleted such as a user account of the administrator from deletion targets according to necessity.

(FIG. 29: Step S512)

When the identification information management program 7610 of the virtual environment management computer 700 receives the completion notification from the domain management computer 830, the identification information management program 7610 updates the user management information 7605.

(FIG. 29: Step S513)

The identification information management program 7610 of the virtual environment management computer 700 acquires, referring to the virtual computer management information 7601, a value of the license identification information field 76016 corresponding to the virtual computer 400 set as the deletion target. The identification information management program 7610 designates the acquired value of the license identification information field 76016 and notifies the license management computer 820 that the use of the OS license is ended.

(FIG. 29: Steps S514 and S515)

When the license management computer 820 receives the use end notification from the virtual environment management computer 700, the license management computer 820 changes the use permission field 82612 of the license management information 8261 from "disable" to "enable" according to necessity (S514). The license management computer 820 transmits completion notification to the virtual environment management computer 700 (S515).

(FIG. 29: Step S516)

When the identification information management program 7610 of the virtual environment management computer 700 receives the completion notification from the license management computer 820, the identification information management program 7610 changes the allocation status fields (76022, 76032, and 76042) of a record corresponding to the virtual computer 400 set as the deletion target in each of the IP address management information 7602, the MAC address management information 7603, and the virtual communication interface management information 7604 to "Null". According to this step, the virtual environment management computer 700 can release the IP address, the MAC address, and the virtual communication interface identification information allocated when the virtual computer 400 is created.

(FIG. 29: Step S517)

The identification information management program 7610 deletes a record corresponding to the virtual computer 400 set as the deletion target in the virtual computer management information 7601.

Figure 30:
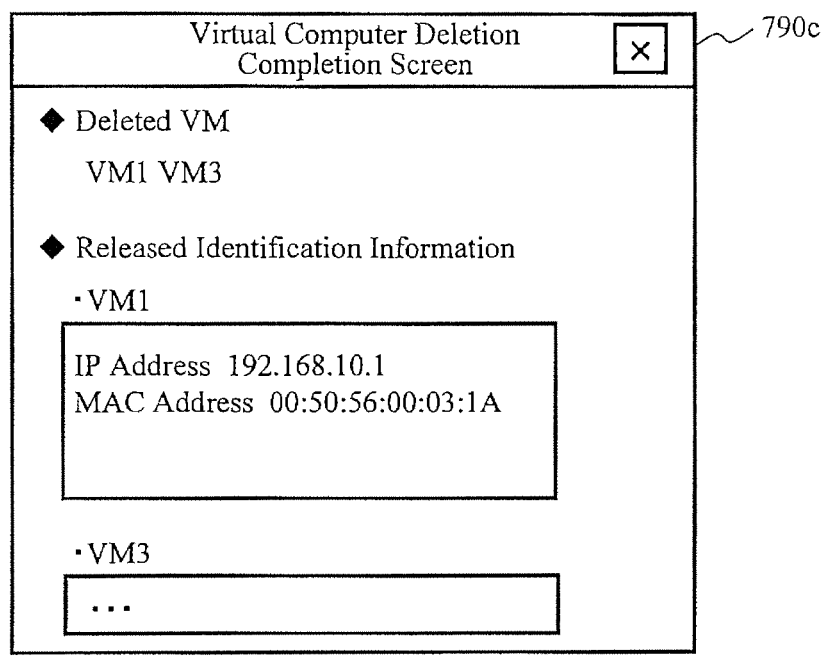
FIG. 30 is a screen image diagram of a virtual computer deletion completion screen 790c displayed by the operation screen 790 of the virtual environment management computer 700.

FIG. 30 is a screen image diagram of the virtual computer deletion completion screen 790c displayed by the operation screen 790 of the virtual environment management computer 700. The screen is displayed on the operation screen 790 of the virtual environment management computer 700 when step S517 in FIG. 29 is completed. The screen displays the identification information of the deleted virtual computer 400 and the IP address, the MAC address, and the virtual communication interface identification information released from the virtual computer 400. Consequently, the administrator can grasp the identification information released by deleting the virtual computer 400.

First Embodiment

Summary

As explained above, the virtual computer management system 1000 according to the first embodiment comprehensively manages MAC addresses, IP addresses, and virtual communication interface identification information on the virtual environment management computer 700. When the virtual environment management computer 700 creates the virtual computer 400 anew, the virtual environment management computer 700 allocates a MAC address, an IP address, and virtual communication interface identification information anew and makes it impossible to allocate the MAC address, the IP address, and the virtual communication interface identification information to the other virtual computers 400 anew. This makes it possible to comprehensively manage MAC addresses, IP addresses, and virtual communication interface identification information and prevents these kinds of identification information from being redundantly allocated.

When the virtual computer management system 1000 according to the first embodiment creates the virtual computer 400 anew, the virtual computer management system 1000 automatically acquires and installs an OS license of the virtual computer 400. The virtual computer management system 1000 registers the virtual computer 400 created anew and a user on an OS of the virtual computer 400 in a network domain. This makes it possible to automate work necessary until the virtual computer 400 is set in a usable state and reduce a work load.

When the virtual computer management system 1000 according to the first embodiment deletes the virtual computer 400, the virtual computer management system 1000 automatically releases an OS license, a MAC address, an IP address, and virtual communication interface identification information. This makes it possible to prevent these kinds of identification information from being exhausted and automate management work involved in the deletion of the virtual computer 400.

Second Embodiment

In the first embodiment, the operation example in which the administrator instructs to delete the virtual computer 400 is explained. On the other hand, under an environment in which the virtual computer 400 is created on a storage extent of the storage subsystem 100, it is likely that the storage extent is deleted on the storage subsystem 100. In this case, the virtual computer 400 is substantially deleted. However, the host computer 300 cannot grasp that the virtual computer 400 is substantially deleted and continues to execute the virtual computer 400 absent.

In this case, identification information such as an IP address and a MAC address allocated to the deleted virtual computer 400 are left unreleased. Therefore, it is likely that these kinds of identification information are exhausted.

Therefore, in a second embodiment of the present invention, when the logical storage extent 11 of the storage subsystem 100 is deleted, the virtual computer 400 associated with the logical storage extent 11 is deleted and identification information allocated to the virtual computer 400 is automatically released. The configuration of the virtual computer management system 1000 is generally the same as that in the first embodiment. Therefore, differences from the first embodiment are mainly explained.

Figure 31:
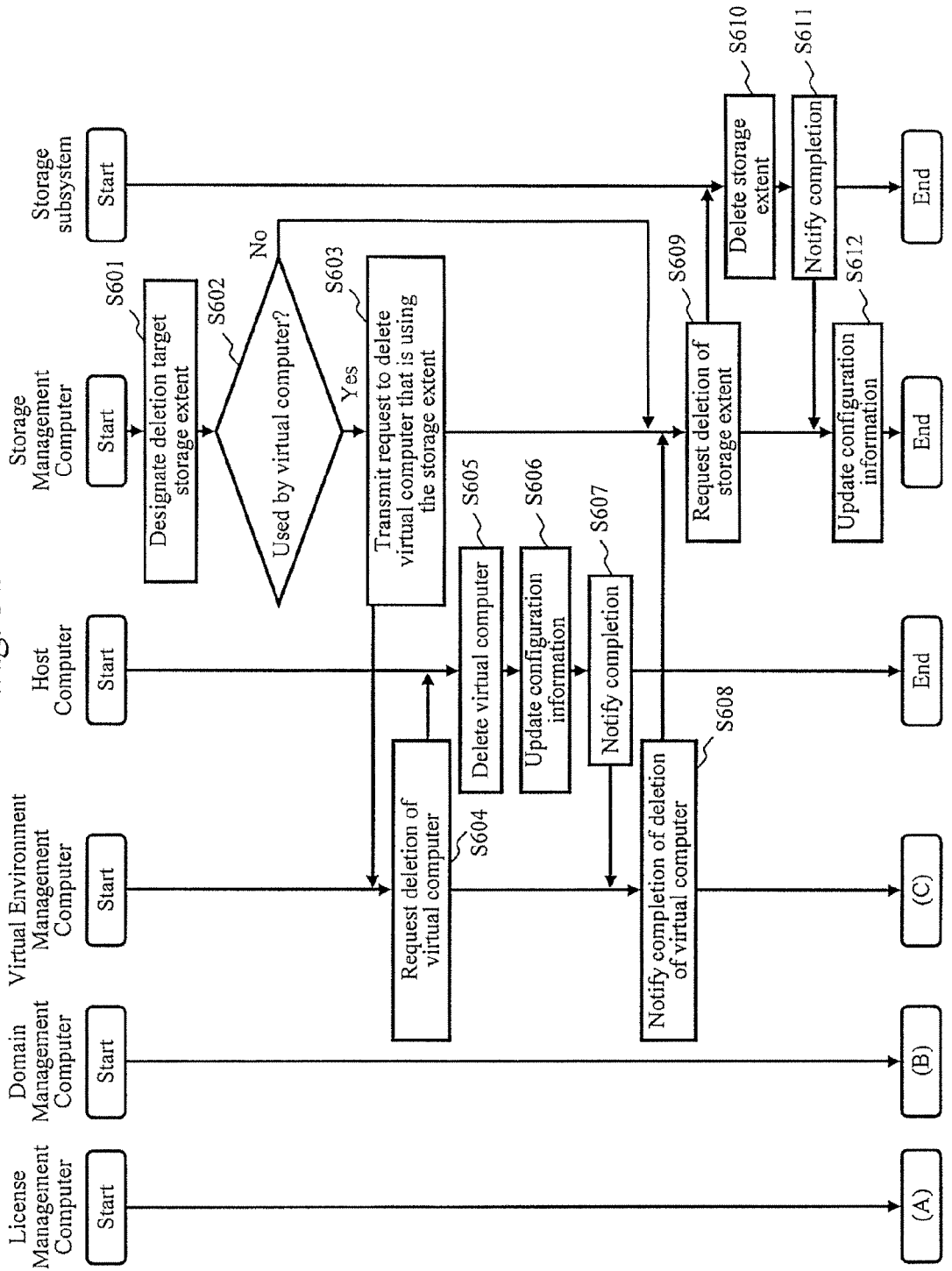
FIG. 31 is a flowchart for explaining a processing procedure in which the virtual computer 400 is deleted when a logical storage extent 11 of the storage subsystem 100 is deleted.
Figure 32:
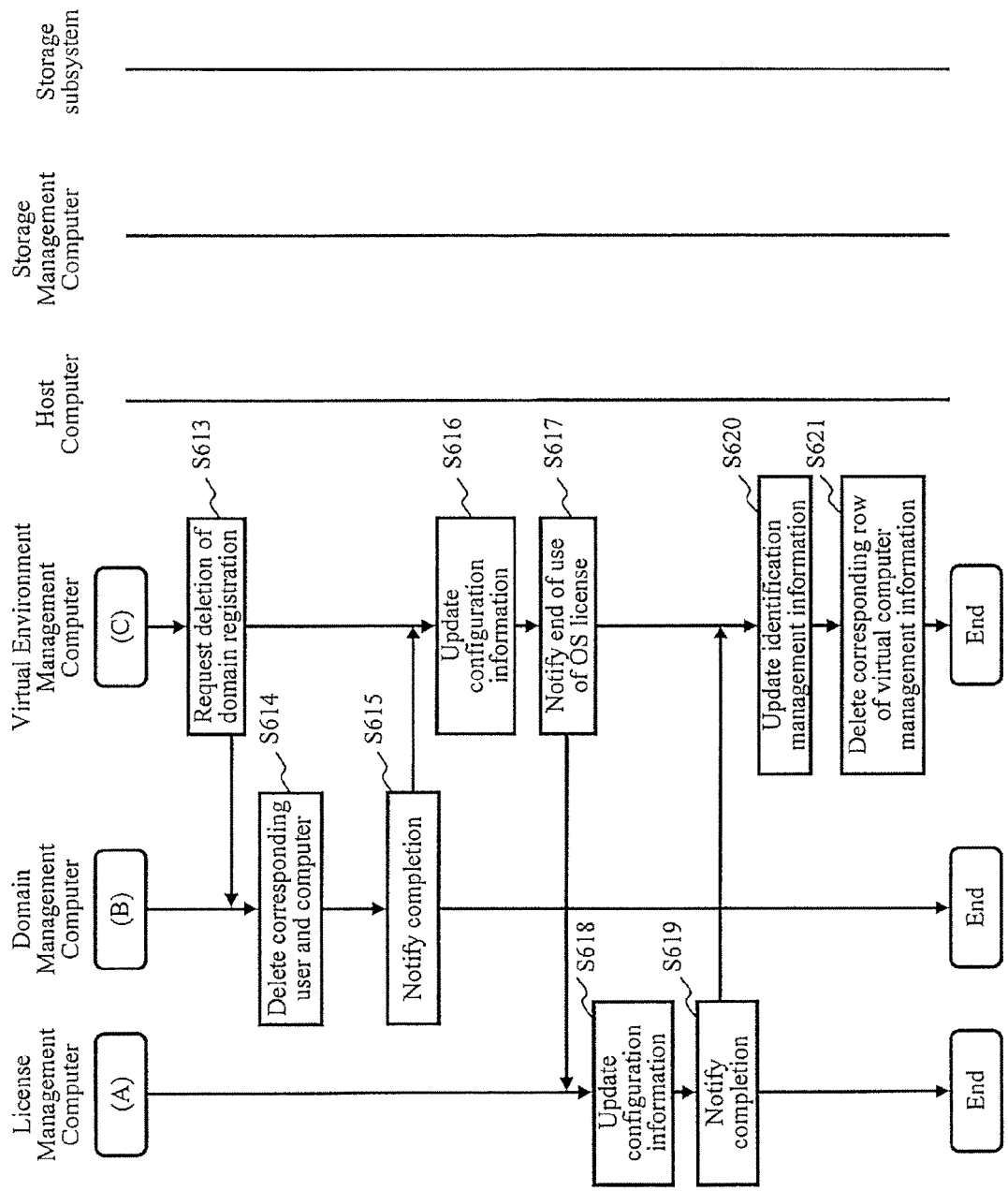
FIG. 32 is a flowchart for explaining the processing procedure in which the virtual computer 400 is deleted when the logical storage extent 11 of the storage subsystem 100 is deleted.

FIGS. 31 and 32 are flowcharts for explaining a processing procedure for deleting the virtual computer 400 in deleting the logical storage extent 11 (or data in the storage extent) of the storage subsystem 100. Although FIGS. 31 and 32 are a series of processing procedures, the processing procedure is divided into the two drawings for convenience of description. Steps are explained below.

(FIG. 31: Step S601)

The storage management computer 500 designates the logical storage extent 11 to be deleted. The administrator may designate the logical storage extent 11 set as a deletion target on the operation screen. Alternatively, the storage management computer 500 may monitor a status of access to the logical storage extent 11 and set the logical storage extent 11 not accesses for a predetermined time or longer as a deletion target.

(FIG. 31: Step S602)

The data deletion indication program 563 of the storage management computer 500 specifies, referring to the virtual computer usage status management information 561, a value of the virtual computer usage status field 5613 corresponding to the logical storage extent 11 set as the deletion target. When the value of the field is "in use", the data deletion indication program 563 determines that the virtual computer 400 is using the logical storage extent 11 and proceeds to step S603. When the value of the field is "not in use", the data deletion indication program 563 determines that the virtual computer 400 is not using the logical storage extent 11 and skips to step S609.

(FIG. 31: Step S603)

The virtual computer usage status management program 566 of the storage management computer 500 specifies, referring to the virtual computer usage status management information 561, a value of the virtual storage unit identification information field 5612 corresponding to the logical storage extent 11 set as the deletion target. The virtual computer usage status management program 566 designates the logical unit 10 recorded in the field and requests the virtual environment management computer 700 to delete the virtual computer 400 that is using the logical unit 10.

(FIG. 31: Step S604)

When the virtual computer deletion indication program 7609 of the virtual environment management computer 700 receives the request to delete the virtual computer 400 from the storage management computer 500, the virtual computer deletion indication program 7609 specifies, referring to the virtual computer storage extent management information 362, the virtual computer 400 corresponding to the logical unit 10 set as the deletion target. The virtual computer deletion indication program 7609 requests the host computer 300 to delete the virtual computer 400. When the virtual environment management computer 700 determines that the virtual computer 400 specified in this step should not be deleted, the virtual environment management computer 700 may request the storage management computer 500 to stop deletion of data in the logical storage extent 11.

(FIG. 31: Step S605)

When the virtual computer deleting program 364 of the host computer 300 receives the request to delete the virtual computer 400 from the virtual environment management computer 700, the virtual computer deleting program 364 specifies, referring to the virtual computer storage extent management information 362, a storage volume used by the virtual computer 400. The virtual computer deleting program 364 deletes the virtual computer 400 in the storage volume.

(FIG. 31: Steps S606 and S607)

The virtual computer storage extent management program 365 of the host computer 300 updates the virtual computer storage extent management information 362 (S606) and transmits completion notification to the virtual environment management computer 700 (S607).

(FIG. 31: Step S608)

When the storage management cooperation program 7607 of the virtual environment management computer 700 receives the completion notification from the host computer 300, the storage management cooperation program 7607 notifies the storage management computer 500 that the deletion of the virtual computer 400 is completed.

(FIG. 31: Step S609)

When the data deletion indication program 563 of the storage management computer 500 receives the completion notification from the virtual environment management computer 700, the data deletion indication program 563 designates the logical storage extent 11 set as the deletion target and requests the storage subsystem 100 to delete the logical storage extent 11.

(FIG. 31: Steps S610 and S611)

When the data deleting program 165 of the storage subsystem 100 receives the deletion request from the storage management computer 500, the data deleting program 165 writes zero data (empty data) in all areas of the logical storage extent 11 (S610) and transmits completion notification to the storage management computer 500 (S611).

(FIG. 31: Step S612)

When the virtual computer usage status management program 566 of the storage management computer 500 receives the completion notification from the storage subsystem 100, the virtual computer usage status management program 566 updates the virtual computer usage status field 5613 of the virtual computer usage status management information 561.

(FIG. 32: Step S613)

The identification information management program 7610 of the virtual environment management computer 700 specifies, referring to the user management information 7605, the virtual computer 400 set as the deletion target and a user name corresponding to the virtual computer 400. The identification information management program 7610 requests the domain management computer 830 to delete registration of the virtual computer 400 and the user name. A user account not used by the virtual computer 400 other than the virtual computer 400 set as the deletion target is a deletion target in this step. A user account used in the virtual computer 400 other than the virtual computer 400 set as the deletion target is not a deletion target in this step.

(FIG. 32: Steps S614 and S615)

When the domain management computer 830 receives the deletion request from the virtual environment management computer 700, the domain management computer 830 specifies the virtual computer 400 and the user account referring to the domain management information 8361a and 8361b and deletes records corresponding to the virtual computer 400 and the user account (S614). The domain management computer 830 transmits completion notification to the virtual environment management computer 700 (S615). The domain management computer 830 may exclude a user account that should not be set as a deletion target such as a user account of the administrator from deletion targets according to necessity.

(FIG. 32: Step S616)

When the identification information management program 7610 of the virtual environment management computer 700 receives the completion notification from the domain management computer 830, the identification information management program 7610 updates the user management information 7605.

(FIG. 32: Step S617)

The identification information management program 7610 of the virtual environment management computer 700 specifies, referring to the virtual computer management information 7601, a value of the license identification information field 76016 corresponding to the virtual computer 400 set as the deletion target. The identification information management program 7610 notifies the license management computer 820 that the use of the OS license is ended.

(FIG. 32: Steps S618 and S619)

When the license management computer 820 receives the use end notification from the virtual environment management computer 700, the license management computer 820 changes the use permission field 82612 of the license management information 8261 from "disable" to "enable" according to necessity (S618) and transmits completion notification to the virtual environment management computer 700 (S619).

(FIG. 32: Step S620)

When the identification information management program 7610 of the virtual environment management computer 700 receives the completion notification from the license management computer 820, the identification information management program 7610 changes the allocation status fields (76022, 76032, and 76042) of a record corresponding to the virtual computer 400 set as the deletion target in each of the IP address management information 7602, the MAC address management information 7603, and the virtual communication interface management information 7604 to "Null". According to this step, the virtual environment management computer 700 can release the IP address, the MAC address, and the virtual communication interface identification information allocated when the virtual computer 400 is created.

(FIG. 32: Step S621)

The identification information management program 7610 of the virtual environment management computer 700 deletes a record corresponding to the virtual computer 400 set as the deletion target in the virtual computer management information 7601.

Second Embodiment

Summary

As explained above, when a storage extent provided by the storage subsystem 100 is deleted, the virtual computer management system 1000 according to the second embodiment notifies the virtual environment management computer 700 to that effect. The virtual environment management computer 700 instructs the host computer 300 to delete the virtual computer 400 that is using the storage extent. In this way, a correspondence relation between storage extents provided by the storage subsystem 100 and the virtual computers 400 is consolidated and comprehensively managed in the virtual environment management computer 700. This makes it possible to maintain consistency even when the storage subsystem 100 and the virtual computers 400 are separately managed.

When the virtual computer management system 1000 according to the second embodiment deletes, according to deletion of a storage extent provided by the storage subsystem 100, the virtual computer 400 corresponding to the storage extent, the virtual computer management system 1000 automatically releases an OS license, a MAC address, an IP address, and virtual communication interface identification information. This makes it possible to provide effects same as those in the first embodiment.

Third Embodiment

In a third embodiment of the present invention, an integrated device 900 in which the storage subsystem 100 and the host computers 300 are integrally configured is explained. A procedure for managing the virtual computer 400 when the integrated device 900 is added, removed, and removed and added is explained.

Figure 33:
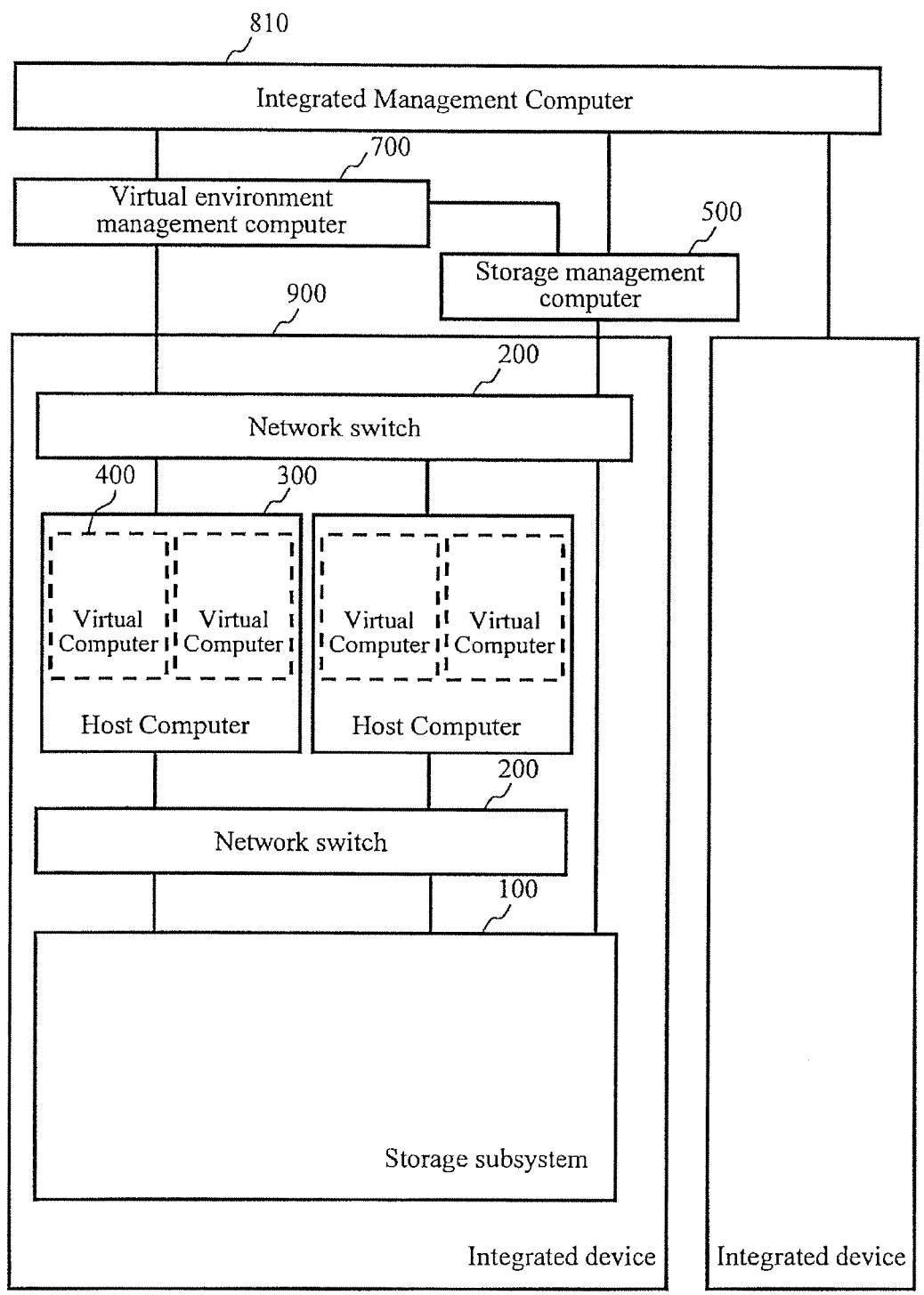
FIG. 33 is a functional block diagram of a virtual computer management system 1000.

FIG. 33 is a functional block diagram of the virtual computer management system 1000 according to the third embodiment. In the third embodiment, the virtual computer management system 1000 includes the integrated device 900. The integrated device 900 is a computer in which the storage subsystem 100, the host computers 300, and the network apparatus 200 are integrally configured in, for example, the same housing. The configurations of the apparatuses are the same as those in the first and second embodiments.

Since the apparatuses of the integrated device 900 are packaged, there are advantages that, for example, the host computers 300 and the like can be added and removed in a unit of the apparatuses gathered together to some extent and reduce a work load for the addition and the removal.

The virtual computer migration program 366 of the host computer 300 can migrate the virtual computer 400 to another host computer 300 by moving the virtual computer image 367 to the other host computer 300. The host computer 300 to which the virtual computer 400 is migrated may be the host computer 300 in the same integrated device 900 or may be a host computer 300 in another integrated device 900.

The virtual environment management computer 700 is connected to the host computers 300 via the network switch 200. The storage management computer 500 is connected to the storage subsystem 100 via the network switch 200.

The integrated management computer 810 comprehensively manages the host computers 300 and the storage subsystem 100. The integrated management computer 810 is connected to the virtual environment management computer 700 and the storage management computer 500 via an appropriate network. The integrated management computer 810 acquires management information from the virtual environment management computer 700 and the storage management computer 500 and manages the host computers 300, the virtual computers 400, and the storage subsystem 100 in a unit of the integrated device 900.

When the integrated device 900 is added, it is necessary to create the virtual computer 400 anew. At this point, the integrated management computer 810 that manages the integrated device 900 may give an instruction to the virtual environment management computer 700 and start step S401 in FIG. 26. Concerning steps S422 to S426, instead of the virtual environment management computer 700, the integrated management computer 810 may communicate with the license management computer 820 and the domain management computer 830 and carry out the processing.

When the integrated device 900 is added in order to supplement insufficiency of the performance of the arithmetic processing device 310 of the host computer 300 and a storage capacity of the storage subsystem 100, the integrated management computer 810 may monitor a use ratio of the arithmetic processing device 310 and a use ratio of the logical storage extent 11 and instruct the virtual computer migration program 366 of the host computer 300 to migrate the virtual computer 400 such that a load can be distributed among the integrated devices 900.

Figure 34:
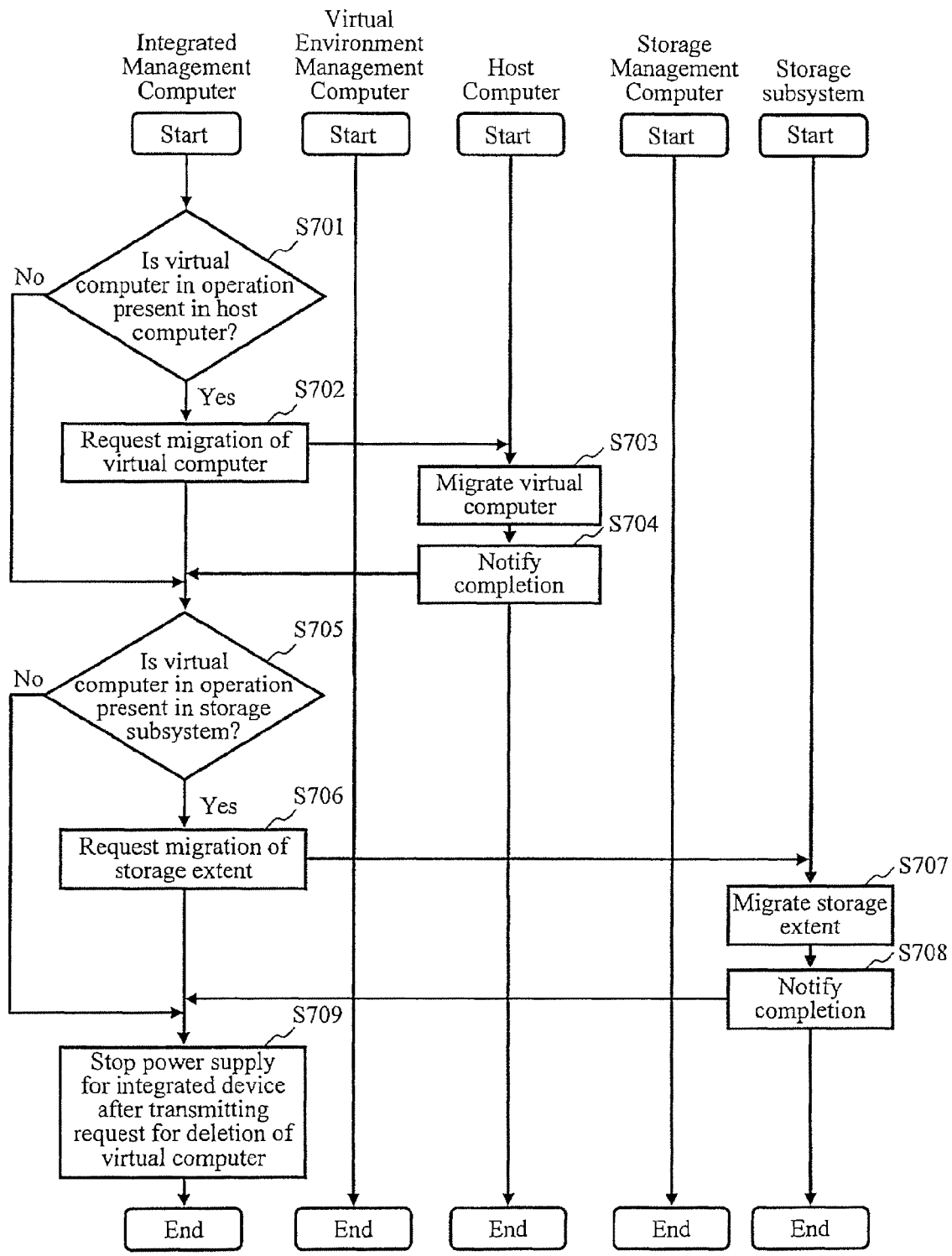
FIG. 34 is a flowchart for explaining a processing procedure in which an integrated device 900 is removed.

FIG. 34 is a flowchart for explaining a processing procedure for removing the integrated device 900. When the integrated device 900 is removed, it is necessary to check in advance whether each of the host computers 300, the virtual computers 400, and the storage subsystem 100 is in operation and, if apparatuses in operation are present, migrate the apparatuses to another integrated device 900. Steps shown in FIG. 34 are explained below.

(FIG. 34: Step S701)

The integrated management computer 810 designates the host computer 300 in the integrated device 900 set as a removal target and determines whether the virtual computer 400 in operation is present in the host computer 300. For example, the integrated management computer 810 may determine whether the virtual computer 400 in operation is present in the host computer 300 referring to the virtual computer storage extent management information 362 or may inquire of a management program, which causes the virtual computer 400 to operate, whether the virtual computer 400 in operation is present in the host computer 300. If the virtual computer 400 in operation is present, the integrated management computer 810 proceeds to step S702 and, if the virtual computer 400 in operation is absent, the integrated management computer 810 skips to step S705.

(FIG. 34: Step S702)

The integrated management computer 810 requests the virtual environment management computer 700 or the host computer 300 to migrate the virtual computer 400 specified in step S701 to the host computer 300 of another integrated device 900 not set as a removal target. In this step, the integrated management computer 810 may monitor a load of the arithmetic processing device 310 of the host computer 300, which is a candidate of a migration destination, and select the migration-destination host computer 300 such that a load balance in the migration destination integrated device 900 is equalized.

(FIG. 34: Steps S703 and S704)

When the virtual computer migration program 366 of the host computer 300 receives the request to migrate the virtual computer 400 from the integrated management computer 810 or the virtual environment management computer 700, the virtual computer migration program 366 migrates the designated virtual computer 400 to the host computer 300 of another integrated device 900 not set as a removal target (S703). The virtual computer migration program 366 transmits completion notification to the integrated management computer 810 or the virtual environment management computer 700 (S704).

(FIG. 34: Step S705)

The integrated management computer 810 determines whether the virtual computer 400 in operation is stored in the logical storage extent 11 provided by the storage subsystem 100 in the integrated device 900 set as the removal target. When the virtual computer 400 in operation is present, the integrated management computer 810 proceeds to step S706. When the virtual computer 400 in operation is absent, the integrated management computer 810 skips to step S709.

(FIG. 34: Step S706)

The integrated management computer 810 requests the storage management computer 500 or the storage subsystem 100 to migrate the logical storage extent 11 specified in step S705 to the storage subsystem 100 in another integrated device 900 not set as a removal target.

(FIG. 34: Step S707 and S708)

When the storage extent migration program 166 of the storage subsystem 100 receives the migration request from the integrated management computer 810 or the storage management computer 500, the storage extent migration program 166 migrates the designated logical storage extent 11 to the storage subsystem 100 in another integrated device 900 not set as a removal target (S707). The storage extent migration program 166 transmits completion notification to the integrated management computer 810 or the storage management computer 500 (S708).

(FIG. 34: Step S709)

After receiving the completion notification in step S708, the integrated management computer 810 deletes the virtual computer 400 running on the host computer 300 in the integrated device 900 set as the removal target. As processing for deleting the virtual computer 400, the procedure indicated by steps S501 to S517 shown in FIG. 29 only has to be used. The integrated management computer 810 stops a power supply for the integrated device 900 after deleting the virtual computer 400.

Third Embodiment

Addition after Removal

For example, in a process for replacing the integrated device 900, it is also conceivable to add a new integrated device 900 after the removal and migrate the migrated virtual computer 400 or the like to the new integrated device 900 again. In this case, it is also possible to record, on the integrated management computer 810, an identifier of the virtual computer 400 migrated in step S703 and an identifier of the logical storage extent 11 migrated in step S707. A processing procedure for adding the integrated device 900 anew after removing the integrated device 900 is explained below.

(Addition after Removal: Step 1)

After adding the integrated device 900, the integrated management computer 810 requests the virtual environment management computer 700 or the host computer 300 to which the virtual computer 400 is migrated in step S703 to migrate the virtual computer 400 migrated in step S703 to the host computer 300 in the added integrated device 900.

(Addition after Removal: Step 2)

The host computer 300 that receives the migration request from the integrated management computer 810 or the virtual environment management computer 700 migrates the designated virtual computer 400 to the host computer 300 in the added integrated device 900. At this point, the integrated management computer 810 may monitor a use ratio of the arithmetic processing device 310 of the host computer and rearrange the virtual computer 400 to equalize a load balance.

(Addition after Removal: Step 3)

The integrated management computer 810 requests the storage management computer 500 or the storage subsystem 100 to which the logical storage extent 11 is migrated in step S707 to migrate the logical storage extent 11 migrated in step S707 to the storage subsystem 100 in the added integrated device 900.

(Addition after Removal: Step 4)

The storage subsystem 100 that receives the migration request from the integrated management computer 810 or the storage management computer 500 migrates the designated logical storage extent 11 to the storage subsystem 100 in the added integrated device 900.

Third Embodiment

Summary

As explained above, the virtual computer management system 1000 according to the third embodiment includes the integrated device 900 in which the storage subsystem 100 and the host computers 300 are integrally configured. The integrated device 900 can reinforce a system simply by being connected to an external system. Therefore, the integrated device 900 is advantageous in terms of a work load.

When the host computer 300 in the integrated device 900 set as a removal target is executing the virtual computer 400, the virtual computer management system 1000 according to the third embodiment migrates the virtual computer 400 to the host computer 300 in another integrated device 900. This makes it possible to smoothly carry out removal without stopping a service provided by the virtual computer 400 before and after the removal.

When the storage subsystem 100 in the integrated device 900 set as the removal target stores the virtual computer 400 in operation, the virtual computer management system 1000 according to the third embodiment migrates the logical storage extent 11 in which the virtual computer 400 is stored to the storage subsystem 100 in another integrated device 900. This makes it possible to display effects same as the effects explained above.

Fourth Embodiment

In a fourth embodiment of the present invention, an example in which the storage subsystem 100 copies the logical storage extent 11 using a writable differential copy (or writable snapshot) function and provides the host computer 300 with the logical storage extent 11 is explained. Since the other components are the same as those in the first to third embodiments, operations related to the writable differential copy are mainly explained.

Differential copy is copy for copying only a portion in which a difference occurs from a certain point in original data or an original storage extent. Since only the difference is copied, a data amount to be copied may be small. The writable differential copy makes it possible to write new data in the data or the storage extent subjected to the differential copy.

The storage subsystem 100 can carry out the differential copy or the writable differential copy according to the differential data writing program 167. The differential data recording indication program 565 of the storage management computer 500 can instruct the differential data writing program 167 to carry out the differential copy or the writable differential copy.

When the writable differential copy is used, a large number of logical storage extents 11 having common data can be generated in a short time. For example, it is possible to store an OS of the virtual computer 400 in the logical storage extent 11 in a copy source, generate new logical storage extents 11 according to the writable differential copy, and allocate the logical storage extents 11 respectively to the virtual computers 400. This makes it possible to efficiently create a large number of virtual computers 400.

However, when the writable differential copy is carried out in multiple stages, when first stage copy is deleted, second stage copy is also deleted. Therefore, it is desirable to check, when the first stage copy is deleted, whether the second stage copy is in use. Similarly, when the writable differential copy is carried out in multiple stages to create the virtual computer 400, even if the logical storage extent 11 in the first stage is not in use by the virtual computer 400, it is likely that the logical storage extent 11 in the second state is in use. Therefore, in the fourth embodiment, before the logical storage extent 11 in the first stage is deleted, a usage status of the logical storage extent 11 in the second stage is checked.

Figure 35:
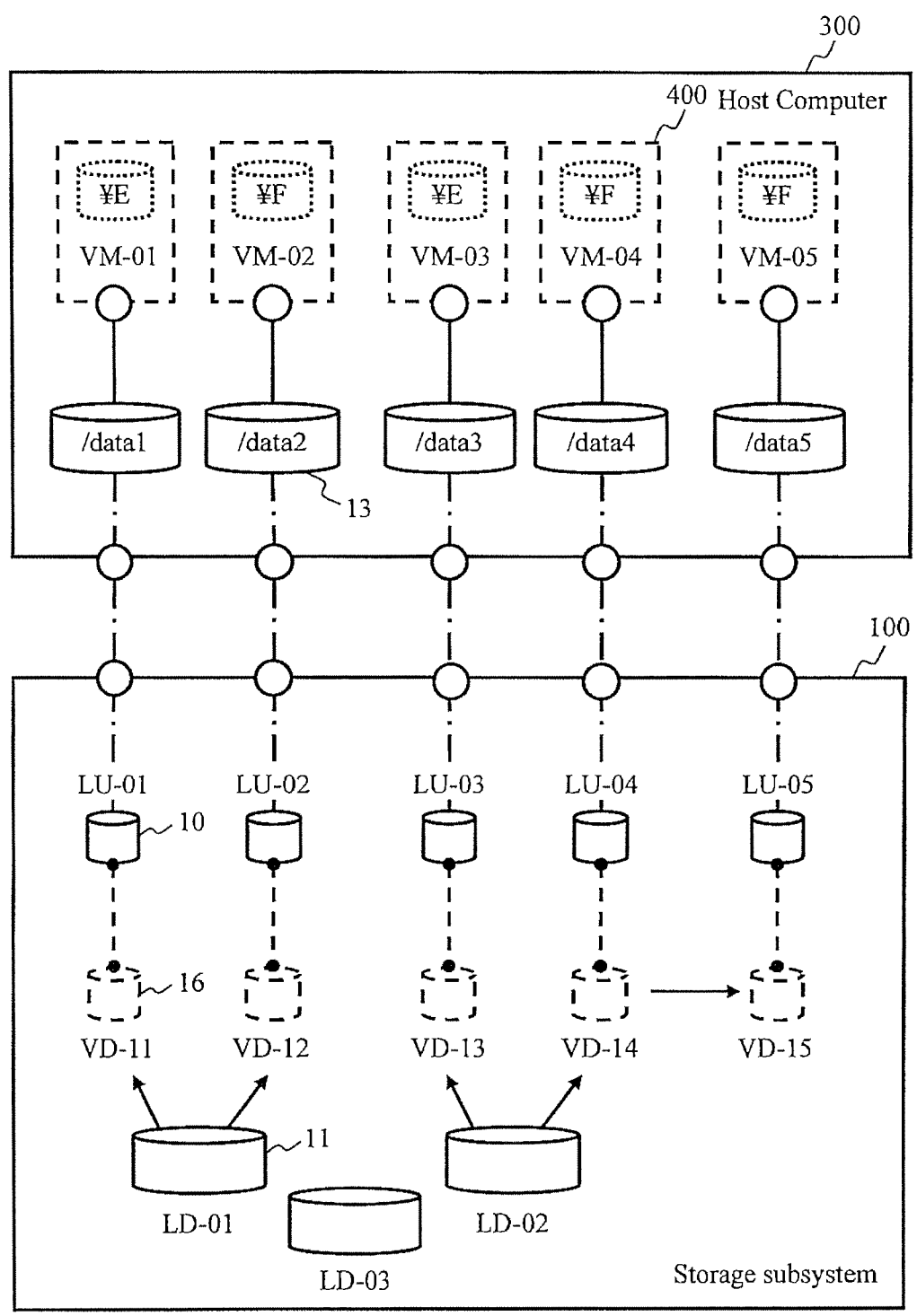
FIG. 35 is a diagram of a configuration example of the host computer 300 and the storage subsystem 100 at the time when the virtual computer 400 is created using a writable differential copy function of the storage subsystem 100.

FIG. 35 is a diagram showing a configuration example of the host computer 300 and the storage subsystem 100 at the time when the virtual computer 400 is created using the writable differential copy function of the storage subsystem 100. With the writable differential copy function, when a file in a virtual logical storage extent 16 in a copy destination is updated, differential data before and after the update is stored in the logical storage extent 11 different from the logical storage extent 16 in the copy destination. For example, data common to the virtual computers 400 such as an OS is stored in the logical storage extent 11 in a copy source and the virtual computer 400 is created using the writable differential copy function. This makes it possible to substantially reduce a consumption amount of the logical storage extent 11.

In the example shown in FIG. 35, a virtual logical storage extent "VD-11" used by the virtual computer "VM-01" and a virtual logical storage extent "VD-12" used by the virtual computer "VM-02" are created by the differential copy of the logical storage extent "LD-01". A virtual logical storage extent "VD-13" used by a virtual computer "VM-03" and a virtual logical storage extent "VD-14" used by a virtual computer "VM-04" are created by the differential copy of the logical storage extent "LD-02". A virtual logical storage extent "VD-15" used by a virtual computer "VM-05" is created by the differential copy of the virtual logical storage extent "VD-14".

A logical storage extent "LD-03" is the logical storage extent 11 in which differential data written with respect to the virtual logical storage extent "VD-11", "VD-12", "VD-13", "VD-14", and "VD-15" is stored.

In the configuration shown in FIG. 35, for example, the virtual computers "VM-01", "VM-02", "VM-03", and "VM-04" are not scheduled to be used and only the virtual computer "VM-05" is scheduled to be used in future.

It is assumed that the processing shown in FIGS. 31 and 32 is started for this configuration with the logical storage extents "LD-01" and "LD-02" set as deletion targets. At this point, the virtual computers "VM-01" and "VM-02" associated with the logical storage extent "LD-01" and the virtual computer "VM-03" and "VM-04" associated with the logical storage extent "LD-02" are not used. Therefore, the logical storage extents "LD-01" and "LD-02" are deleted in the processing in step S610.

Although the virtual computer "VM-05" is scheduled to be used, since the logical storage extent "LD-2" as the copy source of the "VD-14" as the copy source of the virtual logical storage extent "VD-15" used by "VM-05" is deleted, the virtual computer "VM-05" is deleted from the logical storage extent 11 on the storage subsystem 100.

To prevent the inconvenience explained above, in this fourth embodiment, when the virtual computer 400 is created using the writable differential copy, only the logical storage extent 11 not used by the virtual computer 400 is deleted after not only the logical storage extent 11 directly used by the virtual computer 400 but also copy destinations in second and subsequent stages of the logical storage extent 11 are grasped.

Fourth Embodiment

Summary

As explained above, when the virtual computer 400 is created on a storage extent created by the writable differential copy, the virtual computer management system 1000 according to the fourth embodiment checks whether copy destination storage extents in second and subsequent stages are used by the virtual computer 400. Only when the copy destination storage extents in the second and subsequent stages are not used, the virtual computer management system 1000 may delete a copy source storage extent. This makes it possible to keep consistency among the copies while efficiently creating the virtual computer 400 with the writable differential copy function.

The invention devised by the inventor is specifically explained above on the basis of the embodiments. However, the present invention is not limited to the embodiments. It goes without saying that various modifications are possible without departing from the spirit of the present invention.

All or a part of the components, the functions, the processing units, and the like explained above can also be realized as hardware by, for example, designing the components, the functions, the processing units, and the like in an integrated circuit or can be realized as software by a processor executing programs for realizing the respective functions. Information concerning the programs for realizing the functions, tables, and the like can be stored in a storage device such as a memory or a hard disk or a storage medium such as an IC card or a DVD.

REFERENCE SIGNS LIST 10 logical unit
11 logical storage extent
12 RAID group
13 storage volume
100 storage subsystem
110 storage controller
120 magnetic disk drive
130 data I/O interface
140 management interface
150 cache memory
160 program memory
161 logical storage extent configuration information
1611 logical storage extent identification information field
1612 RAID group identification information field
1613 starting block address field
1614 ending block address field
162 logical unit configuration info illation
1621 communication interface identification information field
1622 logical unit identification information field
1623 logical storage extent identification information field
1624 capacity field
163 storage extent management program
164 storage extent creating program
165 data deleting program
166 storage extent migration program
167 differential data writing program
200 network switch
300 host computer
310 arithmetic processing device 320 magnetic disk drive
330 data I/O interface
340 management interface
350 cache memory
360 program memory
361 host computer storage extent configuration information
3611 storage volume identification information field
3612 storage device identification information field
3613 communication interface identification information field
3614 logical unit identification information field
3615 usage field
3616 free capacity field
362 virtual computer storage extent management information
3621 virtual computer identification information field
3622 usage field
3623 storage volume identification information field
3624 logical unit identification information field
363 virtual computer creating program
364 virtual computer deleting program
365 virtual computer storage extent management program
366 virtual computer migration program
367 virtual computer image
371 input interface
372 output interface
380 bus
400 virtual computer
410 arithmetic processing device
420 magnetic disk drive
430 data I/O interface
440 management interface
450 cache memory
460 program memory
461 application
462 operation system
471 input interface
472 output interface
480 bus
500 storage management computer
510 arithmetic processing device
520 magnetic disk drive
540 management interface
550 cache memory
560 program memory
561 virtual computer usage status management information
5611 logical storage extent identification information field
5612 virtual storage unit identification information field
5613 virtual computer usage status field
562 storage extent creation indication program
563 data deletion indication program
564 storage extent migration indication program
565 differential data recording indication program
566 virtual computer usage status management program
571 input interface
572 output interface
580 bus
600 management network
700 virtual environment management computer
710 arithmetic processing device
720 magnetic disk drive
740 management interface
750 cache memory
760 program memory
7601 virtual computer management information
76011 virtual computer identification information field
76012 host name field
76013 MAC address field
76014 virtual communication interface identification information field
76015 IP address field
76016 license identification information field
7602 IP address management information
76021 IP address field
76022 allocation status field
76023 expiration date field
7603 MAC address management field
76031 MAC address field
76032 allocation status
76033 expiration date field
7604 virtual communication interface management information
76041 virtual communication interface identification information field
76042 allocation status field
76043 expiration date field
7605 user management information
76051 virtual computer identification information field
76052 user identification information field
76053 domain field
7606 virtual computer migration indication program
7607 storage management cooperation program
7608 virtual computer creation indication program
7609 virtual computer deletion indication program
7610 identification information management program
771 input interface
772 output interface
780 bus
790 operation screen
810 integrated management computer
820 license management computer
821 arithmetic processing device
822 magnetic disk drive
823 data I/O interface
824 management interface
825 cache memory
826 program memory
8261 license information
82611 license identification information field
82612 use permission field
82613 expiration date field
8271 input interface
8272 output interface
828 bus
830 domain management computer
831 arithmetic processing device
832 magnetic disk drive
833 data I/O interface
834 management interface
835 cache memory
836 program memory
8361 domain management information
83611 domain field
83612 computer identification information field
83613 domain field
83614 user identification information field
8371 input interface
8372 output interface
838 bus
8361 domain management information
900 integrated device
1000 virtual computer management system

The invention claimed is:

1. A method of managing a virtual computer, comprising:
upon receiving a request for creating the virtual computer, the virtual environment management computer performing the steps of:
providing virtual computer identification information for the virtual computer,
requesting mounting of a storage unit from a storage management computer,
receiving, from the storage management computer, configuration information associated with a storage unit to be allocated to the virtual computer;
allocating to the virtual computer, a MAC address, an IP address, and virtual communication interface identification information for identifying a communication interface for Fibre Channel,
setting the state of the MAC address, the IP address, and the virtual communication interface identification information allocated, to be unallocatable,
associating the virtual computer identification information for the virtual computer with the MAC address, the IP address, and the virtual communication interface identification information,
requesting a host computer, to create the virtual computer using the MAC address, the IP address, and the virtual communication interface identification information allocated anew,
requesting a domain management computer, to provide domain settings for the virtual computer,
requesting a license management computer, to provide a useable license for the virtual computer; and
upon receiving a request for deleting the virtual computer, the virtual environment management computer performing the steps of:
requesting the host computer to delete the virtual computer,
when the host computer receives the request to delete the virtual computer for the virtual environment management computer, the host computer performing the steps of:
identifying a storage volume in which the virtual computer is stored by referring to the virtual computer storage extent management information, deleting the virtual computer in the storage volume, updating the virtual computer storage extent management information, and transmitting completion notification to the virtual environment management computer,
requesting the domain management computer, to delete records corresponding to the virtual computer and an associated user account from the domain management information,
when the domain management computer receives a request to delete a registration from the virtual computer management computer, the domain management computer deleting records corresponding to the virtual computer and a user account from the domain management information and transmitting completion notification to the virtual environment management computer,
notifying the license management computer of the end of use of the license associated with the virtual computer,
when the license management computer receives a use end notification, the license management computer changing the license management information associated with the virtual computer and transmitting completion notification to the virtual environment management computer;
automatically releasing the MAC address, the IP address, and the virtual communication interface identification information associated with the virtual computer identification information for the virtual computer based on completion notification received from the storage management computer, host computer, domain management computer, and license management computer; and
wherein the virtual environment management computer, storage management computer, host computer, domain management computer, and license management computer are external computers on different systems.

2. The virtual computer management method according to claim 1, further comprising:
upon receipt of a request for creating the virtual computer, by the at least one computer:
requesting the license management computer to issue a license for an operating system to the virtual computer; and
associating the virtual computer identification information for the virtual computer with the license and an identifier for the network domain; and
upon receipt of the request for the deleting the virtual computer:
notifying the license management computer to stop use of the license; and
deleting the association between the license and the virtual computer identification information for the virtual computer.

3. The virtual computer management method according to claim 1, further comprising:
upon receipt of a request for creating the virtual computer, by the at least one computer:
requesting the domain management computer to register, on the network domain, a user on the operating system running on the virtual computer; and
associating the user and the virtual computer identification information for the virtual computer with the network domain; and
upon receipt of the request for the deleting the virtual computer, by the at least one computer:
requesting the domain management computer to delete the registration; and
deleting the association between the user, the network domain, and the virtual computer identification information for the virtual computer.

4. The virtual computer management method according to claim 1, further comprising, by the at least one computer:
inquiring of a storage subsystem, which provides a storage extent to the virtual computer executed by the host computer, whether a sufficient storage extent for creating the virtual computer is present; and
requesting the storage subsystem to create a storage extent when the sufficient storage extent is not present.

5. The virtual computer management method according to claim 4,
wherein the host computer and the storage subsystem are configured as an integrated device in which the host computer and the storage subsystem are integrally configured;
wherein the virtual computer management method further comprises, by the at least one computer:
receiving a removal request for requesting to remove the integrated device;

checking whether the host computer included in the integrated device requested to be removed is executing the virtual computer;

requesting, when the host computer is executing the virtual computer, the host computer to migrate the virtual computer to another integrated device;

checking whether the storage subsystem included in the integrated device requested to be removed is used by the virtual computer; and requesting, when the storage subsystem is used by the virtual computer, the storage subsystem to migrate the storage extent used by the virtual computer to the other integrated device.

6. A system for managing a virtual computer comprising: a host computer configured to execute a created virtual computer; and a virtual environment management computer comprising a processor and a memory, the virtual environment management computer configured to manage the host computer, and upon receiving a request for creating the virtual computer, the virtual environment management computer is configured to:

provide virtual computer identification information for the virtual computer, request mounting of a storage unit from a storage management computer, receive, from the storage management computer, configuration information associated with a storage unit to be allocated to the virtual computer;

allocate to the virtual computer, a MAC address, an IP address, and virtual communication interface identification information for identifying a communication interface for Fibre Channel, set the state of the MAC address, the IP address, and the virtual communication interface identification information allocated, to be unallocatable, associate the virtual computer identification information for the virtual computer with the MAC address, the IP address, and the virtual communication interface identification information, request a host computer, to create the virtual computer using the MAC address, the IP address, and the virtual communication interface identification information allocated anew, request a domain management computer, to provide domain settings for the virtual computer, request a license management computer, to provide a useable license for the virtual computer;

upon receiving a request for deleting the virtual computer, the virtual environment management computer is configured to:

request the host computer to delete the virtual computer, when the host computer receives the request to delete the virtual computer for the virtual environment management computer, the host computer is configured to:

identify a storage volume in which the virtual computer is stored by referring to the virtual computer storage extent management information, delete the virtual computer in the storage volume, update the virtual computer storage extent management information, and transmit completion notification to the virtual environment management computer, request the domain management computer to delete records corresponding to the virtual computer and an associated user account from the domain management information, when the domain management computer receives a request to delete a registration from the virtual computer management computer, the domain management computer is configured to: delete records corresponding to the virtual computer and a user account from the domain management information and transmit completion notification to the virtual environment management computer, notify the license management computer of the end of use of the license associated with the virtual computer, when the license management computer receives a use end notification from the virtual environment management computer, the license management computer is configured to: change the license management information associated with the virtual computer and transmit completion notification to the virtual environment management computer;

automatically release the MAC address, the IP address, and the virtual communication interface identification information associated with the virtual computer identification information for the virtual computer based on completion notification received from the storage management computer, host computer, domain management computer, and license management computer; and wherein the virtual environment management computer, storage management computer, host computer, domain management computer, and license management computer are external computers on different systems.

7. The virtual computer management system according to claim 6, further comprising:

a storage subsystem configured to provide the virtual computer executed by the host computer with a storage extent;

wherein the virtual environment management computer is configured to:

inquire of the storage subsystem whether a sufficient storage extent for creating the virtual computer requested to be created anew is present; and request the storage subsystem to create a storage extent anew when the sufficient storage extent is not present.

8. The virtual computer management system according to claim 7, wherein the storage subsystem is configured to notify, when a first storage extent in use by a virtual computer is deleted, the virtual environment management computer to that effect, wherein the virtual environment management computer is configured to:

receive the notification to the effect that the first storage extent in use by the virtual computer is deleted; and request the host computer to delete the virtual computer in which the first storage extent in use is deleted.

9. The virtual computer management method according to claim 4, further comprising, by the at least one computer:

receiving notification to the effect that a storage extent in use by a first virtual computer is deleted;

requesting the host computer to delete the first virtual computer in which the storage extent in use is deleted;

requesting the domain management computer to delete, from the network domain, a first user on an operating system running on the first virtual computer in which the storage extent in use is deleted; and requesting the domain management computer to delete, from the network domain, the first virtual computer in which the storage extent in use is deleted.

10. The virtual computer management method according to claim 4, further comprising, by the at least one computer:
receiving notification to the effect that a storage extent in use by a first virtual computer is deleted;
requesting the host computer to delete the first virtual computer in which the storage extent in use is deleted; and
notifying the license management computer to stop use of a first license of an operating system of the first virtual computer requested to be deleted in the deletion request.

11. The virtual computer management method according to claim 4, further comprising, by the at least one computer:
receiving notification to the effect that a storage extent in use by a first virtual computer is deleted;
requesting the host computer to delete the first virtual computer in which the storage extent in use is deleted; and
resetting the MAC address, the IP address, and the virtual communication interface identification information allocated to the first virtual computer requested to be deleted in the deletion request to be able to be allocated anew.

12. The virtual computer management method according to claim 1, further comprising, by the at least one computer:
receiving a request for requesting to delete a first storage extent used by the host computer;
checking whether a virtual computer is created on a third storage extent created by further subjecting a second storage extent, which is created by subjecting the first storage extent requested to be deleted to writable differential copy, to the writable differential copy; and
deleting, when a virtual computer is not created on the second storage extent and the third storage extent, the first storage extent requested to be deleted and not deleting, when a virtual computer is created on the second storage extent or the third storage extent, the first storage extent requested to be deleted.

* * * * *